United States Patent
Grønlund Scholten et al.

(10) Patent No.: US 8,067,066 B2
(45) Date of Patent: Nov. 29, 2011

(54) TIE-COAT COMPOSITION COMPRISING AT LEAST TWO TYPES OF FUNCTIONAL POLYSILOXANE COMPOUNDS AND A METHOD FOR USING THE SAME FOR ESTABLISHING A COATING ON A SUBSTRATE

(75) Inventors: Martin Andreas Grønlund Scholten, Rungsted Kyst (DK); Peter Christian Weinrich Thorlaksen, Gentofte (DK); Annie Oxfeldt Andersen, Herlev (DK); Allan Juul Nielsen, Allerød (DK)

(73) Assignee: Hempel A/S, Lyngby (DK)

( * ) Notice: Subject to any disclaimer, the term of this patent is extended or adjusted under 35 U.S.C. 154(b) by 837 days.

(21) Appl. No.: 10/574,266

(22) PCT Filed: Jun. 15, 2004

(86) PCT No.: PCT/DK2004/000415
§ 371 (c)(1),
(2), (4) Date: Oct. 31, 2006

(87) PCT Pub. No.: WO2005/033219
PCT Pub. Date: Apr. 14, 2005

(65) Prior Publication Data
US 2007/0092738 A1    Apr. 26, 2007

(30) Foreign Application Priority Data
Oct. 3, 2003 (DK) .................. 2003 01458

(51) Int. Cl.
*B05D 1/36* (2006.01)
(52) U.S. Cl. .................. 427/407.1; 427/410
(58) Field of Classification Search ............ 427/407.1, 427/410
See application file for complete search history.

(56) References Cited

U.S. PATENT DOCUMENTS

| | | | |
|---|---|---|---|
| 4,252,933 A | 2/1981 | Sumida et al. | |
| 4,978,704 A | 12/1990 | Perrin et al. | |
| 4,996,112 A | 2/1991 | Perrin et al. | |
| 6,110,536 A | 8/2000 | Harblin | |
| 6,397,464 B1 | 6/2002 | Heigl et al. | |
| 2002/0010228 A1 | 1/2002 | Simendinger | |

FOREIGN PATENT DOCUMENTS

| | | |
|---|---|---|
| EP | 0186839 | 7/1986 |
| EP | 0 521 983 A | 1/1993 |
| EP | 0530718 | 3/1993 |
| EP | 0 576 248 A | 12/1993 |
| EP | 0 620 255 A1 | 10/1994 |
| EP | 1013727 A1 | 6/2006 |
| GB | 2300370 A | 11/1996 |
| JP | 03-258876 | 11/1991 |
| JP | 03259965 | 11/1991 |
| JP | 2001327914 | 11/2001 |
| KR | 2005-026149 | 3/2005 |
| WO | WO 9616109 A1 * | 5/1996 |
| WO | WO-99/33927 A1 | 7/1999 |
| WO | WO-00/77102 A1 | 12/2000 |
| WO | WO 01/70886  * | 9/2001 |
| WO | WO-01/70886 A | 9/2001 |
| WO | WO-01/94446 A1 | 12/2001 |
| WO | WO-02/074870 A1 | 9/2002 |

* cited by examiner

*Primary Examiner* — Dah-Wei Yuan
*Assistant Examiner* — Robert S Walters, Jr.
(74) *Attorney, Agent, or Firm* — Birch, Stewart, Kolasch & Birch, LLP

(57) ABSTRACT

The present invention relates to tie-coat compositions for fouling-release paint systems. The invention provides a method of coating a substrate with a coating composition comprising at least two types of functional polysiloxane compounds selected from epoxy-functional polysiloxanes, amino-functional polysiloxanes, and particular adhesion promoting agents of the polysiloxane type. The present invention also provides a substrate coated with such a composition and a composition particularly useful for said method. The binder phase may also comprise constituents of epoxy paint compositions, e.g. epoxy resins and amine curing agents. The compositions are particularly relevant in combination with diorganopolysiloxane-based fouling-release coatings and anticorrosive epoxy primer coatings.

19 Claims, No Drawings

TIE-COAT COMPOSITION COMPRISING AT LEAST TWO TYPES OF FUNCTIONAL POLYSILOXANE COMPOUNDS AND A METHOD FOR USING THE SAME FOR ESTABLISHING A COATING ON A SUBSTRATE

FIELD OF THE INVENTION

The present invention relates to tie-coat compositions for fouling-release paint systems. The invention provides a method of coating a substrate with a coating composition comprising at least two types of functional polysiloxane compounds selected from epoxy-functional polysiloxanes, amino-functional polysiloxanes, and particular adhesion promoting agents of the polysiloxane type. The present invention also provides a substrate coated with such a composition and a composition particularly useful for said method.

BACKGROUND OF THE INVENTION

Aquatic structures, in particular immersed marine structures that come in contact with water, especially sea water, have a tendency to become fouled by marine organisms. Fouling release paint systems are abundantly used for such structures, e.g. ships, buoys, watercraft structures, etc. in order to suppress settlement of such marine organisms. Fouling-release coating systems for steel structures typically include three principal layers, namely an epoxy-based anti-corrosive layer applied to the steel substrate, a fouling-release layer which typically comprises a polysiloxane-based matrix, and an intermediate layer, often referred to as a "tie-coat", for establishing strong bonding between the otherwise incompatible epoxy-based anticorrosive layer and the polysiloxane-based fouling release layer.

U.S. Pat. No. 4,978,704 and U.S. Pat. No. 4,996,112 (Rhône Poulenc Chemie) disclose organosiloxane compositions comprising 100 parts by weight of an α,ω-dihydroxy-diorganopolysiloxane polymer, 0.5-20 parts by weight of a cross-linking agent, 0.1-10 parts by weight of a bonding agent comprising an aminoorganosilicon compound having at least one amino functional group and an organosilicon compound having at least one epoxy functional group, 2-250 parts by weight of inorganic filler material, and 0.0004-3 parts by weight of a metal catalyst. The compositions are useful for the coating of marine surfaces, e.g. a ship's hull or a net.

EP 1 013 727 A1, U.S. Pat. No. 6,391,464 and U.S. Pat. No. 6,110,536 (General Electric Co.) disclose an epoxy-silicone adhesive paint as a tie-coat for a fouling-release coating. The paint comprises 80-85% by weight of an epoxy resin paint, and 15-20% by weight of a silicone adhesive promoter. The silicone adhesive promoter comprises a volatile hydrocarbon solvent, a partially condensed organosilicate, a solubilized metallic catalyst, and an aminoalkyltrialkoxy-silane.

GB 2 300 370 A1 (General Electric Co.) discloses an article having a fouling-release layer on top of an adhesion promoting layer. The adhesion promoting layer comprises an anti-corrosive material (typically an epoxy-functionalized base material (e.g. an epoxy resin) combined with a curing catalyst) and a bonding agent. The bonding agent may be (i) a moisture curable grafted copolymer comprising a polydialkylsiloxane and at least one ethylenically unsaturated monomer, (ii) an aminofunctionalized polysiloxane fluid, or (iii) an α,ω-diaminofunctionalized polysiloxane fluid.

WO 99/33927 (International Coatings Ltd.) discloses a process for inhibiting fouling. The process includes the formation of a coating comprising a film-forming polymer carrying unreacted curable silicon-containing functional groups providing latent reactivity, and subsequently applying a layer comprising a curable polymeric fouling-inhibiting material and bonding the applied layer to the said coating by a condensation curing reaction involving the unreacted functional groups thereon.

JP 03-258876-A discloses a tie-coat composition comprising the reaction product of an epoxy resin and a dimethylpolysiloxane, and a hardener. The hardener should have an active hydrogen and is selected from polyamines, polyamides, aminosilane coupling agents, phenol resins, alkyd resins, melamine resins and polyurethane resins. The ratio between the epoxy equivalent number of the reaction product and the active hydrogen equivalent number of the hardener should be in the range of 100:50 to 100:200.

EP 0 521 983 discloses a primer composition comprising (A) (i) a primary amine-functional silane, or (ii) the reaction product of a primary amine-functional silane and an epoxy-functional silane, or (iii) the reaction product of a primary amine-functional silane and an α,ω-dihydroxypolydimethylsiloxane oil, (B) a chlorinated polyolefin, and (C) a room-temperature-curable polydiorganosiloxane.

In view of the above, there is still a need for improved or at least alternative tie-coat compositions for fouling-release coating systems.

SUMMARY OF THE INVENTION

In one aspect, the present invention relates to a method of coating a substrate, cf. claim 1.

Another aspect of the present invention relates to a coating composition.

Y (a, b, c)

A further aspect of the present invention relates to an article comprising a substrate, an epoxy-based coating on at least a part of the surface of said substrate, a tie-coat on said epoxy-based coating, and a fouling release coating on said tie-coat.

DETAILED DESCRIPTION OF THE INVENTION

The present invention provides an improved method and an advantageous tie-coat composition particularly useful in connection with fouling-release coating systems.

With reference to the following, it should be understood that the present invention provides a method involving a tie-coat composition wherein at least two types of functional polysiloxanes are included. The binder phase of the tie-coat composition may include a substantial portion of polysiloxane type compounds, or the binder phase of the composition may include polysiloxane type compounds in combination with amino- and/or epoxy-compounds of non-silicon origin, in particular typical constituents of epoxy paint compositions. Thus, one may in a simplified fashion consider the binder phase as having—as the principal non-solvent constituents—a polysiloxane fraction (polysiloxanes and silanes) and possibly also a fraction of one or more constituents of an epoxy paint composition. In some embodiment, the fraction of one or more constituents of an epoxy paint composition may—when measured by %—by wet weight—be fairly large, but in all instances, the binder phase of the tie-coat composition must include at least two types of functional polysiloxanes. This will be explained in details in the following.

The simultaneous presence of amino-functional compounds and epoxy-functional compounds ensures that curing of the composition can take place, namely reaction between amino groups and epoxy groups. As will be understood from the present description with reference to the examples section, the adhesion promoting agent will in most cases further facilitate adhesion between the substrate (or a substrate coated with a primer, in particular an epoxy primer) and tie-coat as well as between the tie-coat and a subsequently applied fouling release coating.

Method of Coating a Substrate

In one aspect, the present invention provides a method of coating a substrate, the method comprising:

(A) applying a coating composition to at least a part of the surface of said substrate thereby establishing a tie-coat on said substrate, wherein said coating composition comprises (I) 0-60%, such as 0-50%, preferably 5-45%, such as 5-40% or 5-35%, by wet weight of pigments and fillers; and (ii) the balance of a binder phase (i.e. the coating composition devoid of any pigments and fillers) comprising:

1-90% by wet weight of amino-functional compounds,
1-90% by wet weight of one or more epoxy-functional compounds, and
0-20% by wet weight of one or more adhesion promoting agents;

wherein the binder phase comprises at least two types, (a), (b), (c), of polysiloxane compounds selected from the group consisting of:

(a) amino-functional polysiloxanes;
(b) epoxy-functional polysiloxanes; and
(c) adhesion promoting agents selected from the group consisting of hydroxy-functional polysiloxanes, hydroxyalkyl-functional polysiloxanes and $C_{1-4}$-alkoxy-functional polysiloxanes; and (B) applying a second coating composition onto said tie-coat thereby establishing a fouling release coating on said substrate.

Binder Phase

The term "binder phase" of the coating composition means the sum of the constituents of the coating composition not being pigments and/or fillers. Typically, the binder phase of the composition constitutes 40-100%, such as 50-100%, e.g. 55-95%, such as 60-95% or 65-95%, by wet weight of the composition. On the other hand, the coating composition typically comprises 0-60%, such as 0-50%, preferably 5-45%, such as 5-40% or 5-35%, by wet weight of pigments and fillers.

The term "% by wet weight of the composition" means the percentage of the respective constituent based on the composition including any solvents.

As mentioned above, the binder phase of the coating composition comprises one or more amino-functional compounds, one or more epoxy-functional compounds and, optionally, one or more adhesion promoting agents.

In many embodiments, the epoxy-functional compound(s) typically include(s) epoxy-functional silicon compounds (most often epoxy-functional polysiloxanes and/or epoxy-functional silanes), and the amino-functional compound(s) typically include(s) amino-functional silicon compounds (most often amino-functional polysiloxanes and/or amino-functional silanes). Furthermore, the adhesion promoting agent may be selected from the group consisting of hydroxy-functional polysiloxanes, hydroxyalkyl-functional polysiloxanes and $C_{1-4}$-alkoxy-functional polysiloxanes.

This being said, it appears to be crucial that at least two different types of polysiloxane compounds are present in the binder phase, name at least two types, (a), (b), (c), of polysiloxane compounds selected from the group consisting of: (a) amino-functional polysiloxanes; (b) epoxy-functional polysiloxanes; and (c) adhesion promoting agents selected from the group consisting of hydroxy-functional polysiloxanes, hydroxyalkyl-functional polysiloxanes and $C_{1-4}$-alkoxy-functional polysiloxanes.

In the present description with claims, the term "polysiloxane" is intended to mean a polydiorganosiloxane, i.e. a polymeric constituent comprising a plurality of diorganosiloxane units.

In one interesting embodiment, the coating composition is a polysiloxane-based coating composition. The term "polysiloxane-based coating composition" is intended to mean a coating composition wherein the binder phase, to the extent of at least 40% by wet weight, is made up of polysiloxane-based constituents. Such polysiloxane-based constituents include any epoxy-functional silicon compounds, amino-functional silicon compounds, and adhesion promoting agent, insofar the latter is of the polysiloxane type. The reference to "epoxy-functional polysiloxane", "amino-functional polysiloxane", "hydroxy-functional polysiloxane", "hydroxyalkyl-functional polysiloxanes", "$C_{1-4}$-alkoxy-functional polysiloxane", etc., similarly means that the respective constituent comprises diorganosiloxane units or polydiorganosiloxane fragments.

In one interesting variant hereof, the epoxy-functional compound(s) essentially consists of one or more epoxy-functional silicon compounds, and the amino-functional compound(s) essentially consists of one or more amino-functional silicon compounds.

In another interesting embodiment, the binder phase of the coating composition comprises one or more constituents of an epoxy paint composition in addition to the mandatory polysiloxane compounds (see further below).

Without being bound to any particular theory, it is believed that the selection of the ratio between the hydrogen equivalents of the amino-functional compound and the epoxy equivalents of the epoxy-functional compound can play a certain role for the performance of the coating composition. Thus, in one embodiment of the method of the invention, the ratio is in the range of 20:100 to 200:100.

The number of "hydrogen equivalents" in relation to the amino-functional compound is defined as grams of the amino-functional compound divided by the hydrogen equivalent weight of the amino-functional compound, where the hydrogen equivalent weight of the amino-functional compound is determined as: grams of the amino-functional compound equivalent to 1 mol of active hydrogens.

The number of "epoxy equivalents" in relation to the epoxy-functional compound is defined as grams of the epoxy-functional compound divided by the epoxy equivalent weight of the epoxy-functional compound, where the epoxy equivalent weight of the epoxy-functional compound is determined as: grams of the epoxy-functional compound equivalent to 1 mol of epoxy groups.

As mentioned above, the binder phase of the coating composition comprises 1-90% by wet weight of epoxy-functional compound(s), in particular 1-90% by wet weight of epoxy-functional silicon compound(s).

The term "% by wet weight" in connection with the binder phase means the percentage of the respective constituent based on the binder phase including any solvents.

The term "epoxy-functional compound(s)" is intended to encompass epoxy-functional silicon compound(s) (see below) as well as epoxy-functional compounds of non-silicon origin as those conventionally utilized in epoxy paint compositions (see further below).

The term "amino-functional compound(s)" is intended to encompass amino-functional silicon compound(s) (see below) as well as amino-functional compounds of non-silicon origin as those conventionally utilized in epoxy paint compositions (see further below).

In a first main embodiment, epoxy-functional compound(s) essentially consists of one or more epoxy-functional silicon compounds, and the amino-functional compound(s) essentially consists of one or more amino-functional silicon compounds.

The term "epoxy-functional silicon compound" is to be understood in the conventional sense, and means a silicon compound, e.g. a silane or polysiloxane compound, having pendant and/or terminal epoxy groups. Illustrative examples of epoxy-functional silicon compounds are epoxy-functional polysiloxanes and epoxysilanes.

In one embodiment, the epoxy-functional silicon compound(s) is/are epoxy-functional polysiloxane(s). The term "epoxy-functional polysiloxane" is to be understood in the conventional sense, and means a linear or branched polymeric constituent having one or more polysiloxane blocks and having pendant and/or terminal epoxy-functionalities. The epoxy functionalities may, e.g., be introduced to the polysiloxane by means of an epoxysilane or by means of an epoxy resin, see e.g. EP 1 086 974 A. In one example hereof, the epoxy-functional polysiloxane is prepared by the reaction between an epoxy resin and a reactive polysiloxane, optionally by the concurrent action of further constituents such as constituents having hydroxyl and/or alkoxy groups, etc. In another example, the epoxy-functional polysiloxane may be prepared by subjecting an epoxysilane and an alkoxysilane mixture to partial hydrolysis and condensation. It should be understood that the epoxy-functional polysiloxane may be prepared in situ if desirable. It should also be understood that the epoxy-functional polysiloxane may advantageously comprise alkoxy- and/or hydroxyl-functionalities.

Although not generally required, it is believed that it may be advantageous to utilize at least one epoxy-functional polysiloxane wherein the polysiloxane backbone or side chains to the polysiloxane backbone include —OH groups or alkoxy groups. Without being bound to any particular theory, it is believed that such hydroxy groups or alkoxy groups may participate in the curing of the tie-coat composition upon exposure to humid environments.

Illustrative examples of commercially available epoxy-functional polysiloxanes are SILKOFTAL ED (epoxy, methoxy polydimethylpolysiloxane) ex Tego; SLM 43226 ex Wacker; ES-1002T and ES-1001T (silicone modified epoxy resin) ex Shin Etsu; etc.

The epoxy-functional polysiloxane(s) typically constitute(s) 25-90%, such as 30-90%, e.g. 40-90% by wet weight of the binder phase.

In another embodiment, the epoxy-functional silicon compound(s) is/are epoxysilane(s). In this embodiment, an amino-functional polysiloxane must be present. Epoxysilanes are frequently defined as silanes of the formula:

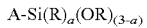

where A is an epoxide-substituted monovalent hydrocarbon radical having 2 to 12 carbon atoms; and each R independently is selected from $C_{1-8}$-alkyl (e.g. methyl, ethyl, hexyl, octyl, etc.), $C_{1-4}$-alkyl-O—$C_{2-4}$-alkyl; aryl (e.g. phenyl) and aryl-$C_{1-4}$-alkyl (e.g. benzyl); and a is 0 or 1.

The group A in the epoxysilane is preferably a glycidoxy-substituted alkyl group, for example 3-glycidoxypropyl. The epoxysilane can for example be 3-glycidoxypropyltrimethoxysilane, 3-glycidoxypropyltriethoxysilane, 3-glycidoxypropyldiethoxymethoxysilane, 2-glycidoxypropyl-trimethoxysilane, 3-(3,4-epoxycyclohexyl)propyltrimethoxysilane, 2-(3,4-epoxy-4-methyl-cyclohexyl)-ethyltrimethoxysilane, 5,6-epoxy-hexyltriethoxysilane.

Commercially available epoxysilanes are 5,6-epoxy-hexyl triethoxysilane (ABCR GmbH & Co. KG, Germany); 3-glycidoxypropyl methyldiethoxysilane (ABCR GmbH & Co. KG, Germany), γ-glycidoxypropyyltrimethoxysilane (Dynasylan, Glymo, Sivento Chemie GmbH, Germany).

In this embodiment, the binder phase comprises 1-60% by wet weight of the epoxysilane(s).

In a still further embodiment, the epoxy-functional silicon compound is the combination of epoxy-functional polysiloxane(s) and epoxysilane(s), i.e. the binder phase comprises one or more epoxy-functional polysiloxanes as well as one or more epoxysilanes. This combination can be accomplished by adding an epoxy-functional polysiloxane (as described above) and an epoxysilane (as defined above), or by using a reaction product between an epoxysilane and a polysiloxane in which a portion of the epoxysilane remains unreacted.

In this embodiment, the binder phase typically comprises 2-90%, such as 5-85%, by wet weight of the epoxy-functional polysiloxane(s)/epoxysilane(s) (i.e. the combination of the epoxy-functional polysiloxane and the epoxysilane).

As mentioned above, the binder phase also comprises 1-90% by wet weight of amino-functional compound(s), in particular 1-90%, by wet weight of amino-functional silicon compound(s).

The term "amino-functional silicon compound" is to be understood in the conventional sense, and means a silicon compound, e.g. a silane or polysiloxane compound, having pendant and/or terminal amino groups. Illustrative examples of amino-functional silicon compounds are amino-functional polysiloxanes and aminosilanes.

In one embodiment of the invention, the amino-functional silicon compound(s) is/are amino-functional polysiloxane(s). The term "amino-functional polysiloxane" means a linear or branched polymeric constituent having one or more polysiloxane blocks and having pendant and/or terminal amino-functionalities.

The amino functionalities may, e.g., be introduced to the reactive polysiloxane by means of an aminosilane (i.e. an aminosilane such as those defined below), see e.g. U.S. Pat. No. 4,857,608. It should also be understood that the amino-functional polysiloxane may be prepared in situ. In some examples, a hydroxyl-functional or alkoxy-functional polysiloxane is reacted with an aminosilane whereby amino-functionalities are introduced. For example an aminosilane can be reacted with an α,ω-dihydroxypolydimethylsiloxane at a temperature in the range of 20-80° C., preferably using 0.4-1.2 alkoxy groups of the aminosilane per silanol group of the polysiloxane. If an excess of aminosilane is used, or if the reaction is not allowed to proceed to completion, a small amount of aminosilane may remain in the product. In one embodiment, at least one amino-functional polysiloxane is the reaction product of a polysiloxane and an aminosilane.

Examples of amino-functional polysiloxanes are α,ω-di-amino-functional polysiloxanes (e.g. polysiloxane fluids). Illustrative examples of commercially available amino-functional polysiloxanes are SILRES HP 2000 (amino-functionalised methyl-phenyl silicone) ex Wacker; SF1708 (Amino functionalised polysiloxane fluid) ex General Electric Co.; etc.

Although not generally required, it is believed that it may be advantageous to utilize at least one amino-functional polysiloxane wherein the polysiloxane backbone or side chains to the polysiloxane backbone include —OH groups or alkoxy groups. Without being bound to any particular theory, it is believed that such hydroxy groups or alkoxy groups may participate in the curing of the tie-coat composition upon exposure to humid environments.

In this embodiment, the binder phase typically comprises 1-60%, such as 15-60%, e.g. 15-50% or 20-40%, by wet weight of the amino-functional polysiloxane(s).

Preferably, the ratio between the hydrogen equivalents of the amino-functional polysiloxane(s) and the epoxy equivalents of the epoxy-functional silicon compound(s) is in the range of 40:100 to 200:100.

In another embodiment, the amino-functional silicon compound(s) is/are aminosilane(s). In this embodiment, an epoxy-functional polysiloxane must be present. Aminosilanes are frequently defined as silanes of the formula:

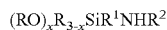

wherein each R independently is selected from $C_{1-8}$-alkyl (e.g. methyl, ethyl, hexyl, octyl, etc.), $C_{1-4}$-alkyl-O—$C_{2-4}$-alkyl; aryl (e.g. phenyl) and aryl-$C_{1-4}$-alkyl (e.g. benzyl); $R^1$ is selected from —$(CH_2)_{2-4}$—, methyl-substituted trimethylene, and —$(CH_2)_{2-3}$—O—$(CH_2)_{2-3}$; $R^2$ is selected from hydrogen and —$(CH_2)_{2-4}$—$NH_2$.

Illustrative examples of aminosilanes are $(CH_3O)_3Si(CH_2)_3NH(CH_2)_2NH_2$; $(CH_3CH_2OCH_2CH_2O)_3Si(CH_2)_2NH_2$; $(C_2H_5O)_3Si(CH_2)_3NH_2$; $(CH_3OCH_2O)_3Si(CH_2)_3NH_2$; $(C_2H_5O)_3Si(CH_2)_3O(CH_2)_3NH_2$; $(C_2H_5O)_2C_6H_5Si(CH_2)_3NH_2$; $(C_2H_5O)_3SiCH_2O(CH_2)_2NH_2$; $(C_2H_5O)_3Si(CH_2)_3O(CH_2)_2NH_2$; and $(C_2H_5O)_2CH_3Si(CH_2)_3NH_2$. Illustrative examples of commercially available aminosilanes are Dynasilan AMEO (3-aminopropyltriethoxysilane) ex Degussa Hüls; KBM603 (N-β-aminoethyl-γ-aminopropyltrimethoxysilane) ex Shin Etsu; etc.

In this embodiment, the binder phase comprises 1-60%, such as 1-30%, e.g. 1-20%, such as 1-10%, by wet weight of the aminosilane(s).

Preferably, the ratio between the hydrogen equivalents of the aminosilane(s) and the epoxy equivalents of the epoxy-functional silicon compound(s) is in the range of 20:100 to 100:100, such as 20:100 to 75:100, e.g. 20:100 to 49:100.

In a still further embodiment, the amino-functional silicon compound(s) is/are the combination of amino-functional polysiloxane(s) and aminosilane(s), i.e. the binder phase comprises one or more amino-functional polysiloxanes as well as one or more aminosilane(s). This combination can be accomplished by adding an amino-functional polysiloxane (as described above) and an aminosilane (as defined above), or by using a reaction product between an aminosilane and a polysiloxane in which a portion of the aminosilane remains unreacted.

In this embodiment, the binder phase typically comprises 1-60%, such as 2-60%, e.g. 5-55%, by wet weight of the amino-functional polysiloxane(s)/aminosilane(s) (i.e. the combination of the amino-functional polysiloxane(s) and the aminosilane(s)). More particularly, when the amino-functional silicon compounds has a fraction Z of amino-functional polysiloxane(s) and a fraction (1−Z) of aminosilane(s), the binder phase typically comprises in the range of from [Z×15+(1−Z)×1]% to [Z×60+(1−Z)×30]%, such as in the range of from [Z×20+(1−Z)×1]% to [Z×40+(1−Z)×20]%, by wet weight of the combination of the amino-functional polysiloxane(s) and the aminosilane(s).

Preferably, the ratio between the hydrogen equivalents of the amino-functional polysiloxane/aminosilane and the epoxy equivalents of the epoxy-functional silicon compound is in the range of 20:100 to 200:100.

It is furthermore preferred that the ratio between the hydrogen equivalents of the aminosilane(s) and the epoxy equivalents of the epoxy-functional polysiloxane(s) is in the range of 20:100 to 75:100.

Without being bound to any particular theory, it is believed that the embodiments where an epoxy-functional polysiloxane and/or an amino-functional polysiloxane of the binder phase comprise hydroxy- or alkoxy-functional groups (see above), e.g. hydroxyalkyl and hydroxy-Si groups, are particularly advantageous.

The composition must comprise at least one of an epoxy-functional polysiloxane and an amino-functional polysiloxane. In particular embodiments, the composition comprises an epoxy-functional polysiloxane as well as an amino-functional polysiloxane.

Within the first main embodiment, binder phase typically comprises 26-90%, such as 45-90%, wet weight of polysiloxane-based constituents.

In a second main embodiment, the at least two types of polysiloxane compounds ((a) amino-functional polysiloxanes; (b) epoxy-functional polysiloxanes; (c) adhesion promoting agents selected from the group consisting of hydroxy-functional polysiloxanes, hydroxyalkyl-functional polysiloxanes and $C_{1-4}$-alkoxy-functional polysiloxanes) are used in admixture with one or more epoxy-functional compounds of non-silicon origin and/or amino-functional compounds of non-silicon origin, e.g. constituents of an epoxy paint composition. Thus, in one variant hereof, the epoxy-functional compound(s) comprise(s) one or more epoxy-functional compounds of non-silicon origin, and the amino-functional compound(s) comprises(s) one or more amino-functional compounds of non-silicon origin.

Within this embodiment, the polysiloxane type and silane type constituents (i.e. constituents contributing to the polysiloxane character of the coating composition) typically constitute 2-90%, or 2-50%, such as 2-30%, e.g. 2-15%, by wet weight of the binder phase and the constituents of an epoxy paint composition (i.e. one or more epoxy-functional compounds of non-silicon origin and/or amino-functional compounds of non-silicon origin) typically constitute 10-80%, or 30-80%, such as 10-55%, e.g. 30-55%, by wet weight of the binder phase.

The term "epoxy-functional compounds of non-silicon origin" is intended to encompass typical "epoxy resin" constituents of epoxy paint compositions. As examples of commercially available "epoxy-functional compounds of non-silicon origin" can be mentioned: Bisphenol A/bisphenol F epoxides: Epikote 235 ex. Resolution Performance Products Holland; bisphenol A epoxides: Epikote 828 EL or Epikote 1004 or Epikote 1009 or Epikote 872-X-75 ex. Resolution Performance Products Holland, Araldite GZ 7071X75CH ex. Huntsman Advanced Materials Switzerland, DER 684-EK 40 ex. Dow Chemicals USA; epoxy novolac resins: DEN 438-X 80 ex. Dow Chemical Company USA, aliphatic epoxy resins: Eponex 1510 ex. Resolution Performance Products Holland; epoxy functional acrylic polymers: Synocure 899 BA 60 ex. Cray Valley UK; epoxy esters: Duroxyn EF 900 ex. Solutia Germany GmbH Germany, reactive epoxy diluents: Cardura E 10 P ex. Resolution Performance Products Holland, Heloxy Modifier 8 ex. Resolution Performance Products USA, Araldite DY-L/BD ex. Huntsman Advanced Materials Germany, Polypox R 18 ex. Ulf Prümmer Polymer Chemie Germany, Epodil 757 ex. Air products Plc USA.

The term "amino-functional compounds of non-silicon origin" is intended to encompass typical "amino"/"curing agent"/"hardener" constituents of epoxy paint compositions. As examples of commercially available "amino-functional compounds of non-silicon origin" can be mentioned: Polyamines (arylyl): Epoxy Hardener MXDA ex. Mitsubishi Gas Chemical Company Inc USA; polyamines (aliphatic): DEAPA or DETA ex. BASF Germany; polyamines (cycloaliphatic): Aradur 42 BD ex. Huntsman Advanced Materials Switzerland; formulated amines: Sunmide 3-230N ex. Sanwa Chemical Company Inc USA, Ancamide X2280 ex. Air Products Plc USA, HY 1207 BD ex. Huntsman Advanced Materials Switzerland; polyamine adducts: Aradur 2964 CH or Aradur 2969 CH or Aradur 863 XW 80 CH or Aradur 837 CH or Aradur 943 CH ex. Huntsman Advanced Materials Switzerland, Ancamine 2074 or Ancamine 1734 or Ancamine 1735 or Ancamine 2134 ex. Air Products Plc USA; Polyaminoamides: Sunmide 300-60 LH or Sunmide 305-70X ex. Sanwa Chemical Singapore, Uni-rez 2125-X70 ex. Arizona Chemical USA, Ancamide 350A or Ancamide 2353 ex. Air Products Plc USA; Polyamide adducts: Aradur 460 J90 BD ex. Huntsman Advanced Materials Switzerland; Mannich bases: Ancamine MCA or Ancamine 1856 or Ancamine K54 ex. Air Products Plc USA, Polypox VH 40311/55 or Polypox VH 40294 ex. Ulf Prümmer Polymer Chemie Germany, Aradur 16 BD or Aradur 3441 X90 ex. Huntsman Advanced Materials Switzerland.

Examples of commercial epoxy paint compositions, i.e. commercially relevant examples of combinations of epoxy-functional compounds of non-silicon origin and amino-functional compounds of non-silicon origin, to be used within the context of the present invention are commercially available primers to be used under the waterline for antifouling and fouling release products, e.g. Hempadur 15570, from Hempel A/S; Intershield 300 ex. International Coatings Ltd UK; Primastic Universal ex. Jotun A/S Norway; and Umeguard SX ex. CMP Coatings Inc USA.

Within the second main embodiment, the epoxy-functional silicon compound(s) and the amino-functional silicon compound(s) are typically as defined for the first main embodiment.

In one embodiment, the epoxy functional compound(s) consist(s) of one or more epoxy-functional compounds of non-silicon origin and one or more epoxy-functional silicon compounds as defined above.

The epoxy-functional silicon compound(s) may be epoxy-functional polysiloxane(s). In this event, the binder phase typically comprises 1-60%, such as 1-30%, e.g. 1-20%, by wet weight of epoxy-functional polysiloxane(s).

Alternatively, the epoxy-functional silicon compound(s) may be the combination of epoxy-functional polysiloxane(s) and epoxysilane(s). In this event, the binder phase typically comprises 1-60%, such as 1-30%, e.g. 1-20%, by wet weight of the epoxy-functional polysiloxane(s)/epoxysilane(s).

Within this second main embodiment, the amino functional compound(s) may consist of one or more amino-functional compounds of non-silicon origin and one or more amino-functional silicon compounds.

The amino-functional silicon compound(s) may be amino-functional polysiloxane(s). In one variant, at least one amino-functional polysiloxane is the reaction product of a polysiloxane and an aminosilane. In both cases, the binder phase typically comprises 1-60%, such as 1-30%, or 1-20%, by wet weight of the amino-functional polysiloxane(s).

Alternatively, the amino-functional silicon compound(s) may be the combination of amino-functional polysiloxane(s) and aminosilane(s). In this event, the binder phase may comprise 1-60%, such as 1-30%, e.g. 1-20%, by wet weight of the amino-functional polysiloxane(s)/aminosilane(s).

Also within the second main embodiment, the ratio between the hydrogen equivalents of the amino-functional compound(s) and the epoxy equivalents of the epoxy-functional compound(s) is typically in the range of 20:100 to 200:100.

In a third main embodiment, the at least two types of polysiloxane compounds ((a) amino-functional polysiloxanes; (b) epoxy-functional polysiloxanes; (c) adhesion promoting agents selected from the group consisting of hydroxy-functional polysiloxanes, hydroxyalkyl-functional polysiloxanes and $C_{1-4}$-alkoxy-functional polysiloxanes) are used in admixture with epoxy-functional compound(s) of non-silicon origin, e.g. the epoxy resin constituents of an epoxy paint composition.

Within this embodiment, the polysiloxane type and silane type constituents (i.e. constituents contributing to the polysiloxane character of the coating composition) typically constitute 2-90%, or 2-40%, such as 2-30%, or 2-15%, by wet weight of the binder phase and epoxy-functional compound(s) of non-silicon origin typically constitute 10-70%, or 20-70%, such as 10-45%, e.g. 20-45%, by wet weight of the binder phase.

Within the second main embodiment, the epoxy-functional silicon compound(s), the amino-functional silicon compound(s), and the epoxy-functional compound of non-silicon origin are typically as defined for the second main embodiment.

Also within the second main embodiment, the ratio between the hydrogen equivalents of the amino-functional compound(s) and the epoxy equivalents of the epoxy-functional compound(s) is typically in the range of 20:100 to 200:100.

The polysiloxane coating applied according to the invention is typically used as a tie-coat, and it is therefore often desirable to include an adhesion promoting agent in the binder phase so as to improve the subsequent adhesion of a top-coat, e.g. fouling release coating (see below). Thus, in one preferred embodiment, the binder phase of the coating composition further comprises an adhesion promoting agent.

Without being bound to any particular theory, the term "adhesion promoting agent" is intended to mean that the agent in question has a beneficial impact on adhesion between the tie-coat and a subsequent layer applied onto the tie-coat.

In one embodiment, the adhesion promoting agent is a polydiorganosiloxane of viscosity 60-10,000 mPas, such as 60-5,000 mPas, e.g. 60-1000 mPas, at 25° C. It preferably contains silicon-bonded hydroxyl groups, for example an α,ω-dihydroxypolydiorganosiloxane, or silicon-bonded hydrolysable groups, for example a polydiorganosiloxane tipped with silicon-bonded hydrolysable groups such as $C_{1-4}$-alkoxy groups (e.g. methoxy groups). More preferably, it is formed of recurring diorganosiloxy units of the formula —Si(R)$_2$O—, wherein R is selected from $C_{1-8}$-alkyl (such as methyl, ethyl, n-propyl, isopropyl, n-butyl, n-pentyl, n-hexyl, 2-ethyl hexyl and n-octyl), $C_{4-8}$-cycloalkyl (such as cyclopentyl, cyclohexyl and methylcyclohexyl), $C_{2-4}$-alkenyl (such as vinyl, allyl or buten-2-yl), aryl (such as phenyl) and aryl-$C_{1-4}$-alkyl (such as tolyl and xylyl).

More specific examples of suitable α,ω-dihydroxypolydiorganosiloxanes are those of the formula HO—[Si(R)$_2$O]—H wherein each R independently is selected from methyl and phenyl, and where n is an integer in the range of 4-1000, such as 10-250.

More specific examples of suitable α,ω-dimethoxypolydiorganosiloxanes are those of the formula MeO—[Si(R)$_2$O]$_n$—Me wherein each R independently is selected from methyl and phenyl, and where n is an integer in the range of 4-100, such as 10-50.

Alternatively, the adhesion promoting agent is an hydroxyalkyl-functional polysiloxane.

Examples of the adhesion promoting agent are particularly those selected from the group consisting of hydroxy-functional polysiloxanes, hydroxyalkyl-functional polysiloxanes and $C_{1-4}$-alkoxy-functional polysiloxanes, in particular hydroxy-functional polysiloxanes and $C_{1-4}$-alkoxy-functional polysiloxanes, e.g. those illustrated immediately above.

Å g/mol (Dalton)

Illustrative examples of commercially available polysiloxane adhesion promoting agents are Rhodorsil oil 48V100 (hydroxyl-functional polydimethylslioxane) ex Rhodia; KF-6001 alkoxypolydimethylsiloxane ex Shin Etsu; Dow Corning 2-1273; etc.

Preferably, the binder phase comprises 0-20%, or 0.1-20%, such as 0.1-15%, e.g. 0.5-10%, by wet weight of the adhesion promoting agent(s).

In some advantageous embodiments, the (weight) average molecular weight of the adhesion promoting agent is less than 50,000 Å, or less than 25,000 Å, e.g. 500-50,000Å, or 1000-10,000 Å.

The coating composition used in the method of the invention may comprise other constituents such as pigments and fillers, as well as solvents and additives as described below under the subheading "Coating Composition".

The term "substrate" is intended to mean a solid material onto which the coating composition is applied. The substrate typically comprises a metal such as steel, iron, aluminium, or a glass-fibre. In the most interesting embodiments, the substrate is a metal substrate, in particular a steel substrate. In an alternative embodiment, the substrate is a glass-fibre substrate.

The term "surface" is used in its normal sense, and refers to the exterior boundary of an object. Particular examples of such surfaces are the surface of vessels (including but not limited to boats, yachts, motorboats, motor launches, ocean liners, tugboats, tankers, container ships and other cargo ships, submarines, and naval vessels of all types), pipes, shore and off-shore machinery, constructions and objects of all types such as piers, pilings, bridge substructures, waterpower installations and structures, underwater oil well structures, nets and other aquatic culture installations, and buoys, etc.

The surface of the substrate may either be the "native" surface (e.g. the steel surface), or the substrate may be coated, e.g. with an anticorrosive coating, so that the surface of the substrate is constituted by such a coating. When present, the (anticorrosive) coating is typically applied in a total dry film thickness of 100-600 µm, such as 150-450 µm, e.g. 200-400 µm. Alternatively, the substrate may carry a paint coat, e.g. a worn-out antifouling paint coat, or similar.

In one important embodiment, the substrate is a metal substrate (e.g. a steel substrate) coated with an anticorrosive coating such as an anticorrosive epoxy-based coating, e.g. cured epoxy-based coating, or a shop-primer, e.g. a zinc-rich shop-primer. In another relevant embodiment, the substrate is a glass-fiber substrate coated with an epoxy primer coating.

The term "applying" is used in its normal meaning within the paint industry. Thus, "applying" is conducted by means of any conventional means, e.g. by brush, by roller, by spraying, by dipping, etc. The commercially most interesting way of "applying" the coating composition is by spraying. Spraying is effected by means of conventional spraying equipment known to the person skilled in the art. The coating is typically applied in a dry film thickness of 20-900 µm, such as 20-750 µm, e.g. 50-600 µm.

The term "at least a part of the surface of said substrate" refers to the fact that the coating composition may be applied to any fraction of the surface. For many applications, the coating composition is at least applied to the part of the substrate (e.g. a vessel) where the surface (e.g. the ship's hull), possibly after application of a fouling release layer, may come in contact with water, e.g. sea-water.

In a particular embodiment of the invention, a second coating composition is subsequently applied onto said tie-coat, whereby a polysiloxane-based coating, in particular a polysiloxane-based fouling release coating, is established on said substrate.

The second polysiloxane-based coating (the top-coat) may be a reaction-curable top-coat or a moisture-curable top-coat as will be evident for the person skilled in the art. Examples hereof are a two-component reaction-curing top-coat based on a hydroxyl-reactive polydiorganosiloxane, or a one-component moisture-curable top-coat based on a polydiorganosiloxane with alkoxy reactivity.

Preferably, the second polysiloxane-based coating is a fouling release coating. The fouling release coating can be established by any conventional fouling release coating composition. In one embodiment, the second polysiloxane-based coating composition comprises a polydimethylsiloxane.

The second polysiloxane-based coating is typically applied in a dry film thickness of 20-500 µm, such as 20-400 µm, e.g. 50-300 µm. The second polysiloxane-based coating composition is typically applied as described above under the definition of the term "applying".

It is envisaged that a possible alternative embodiment of the invention is that where the fouling release coating is established using a composition comprising a fluorinated resin either alone or in combination with polysiloxanes, e.g. 50-95% of a fluoro-polymer and 5-50% of a polysiloxane. Such fluorinated resins are, e.g., disclosed in WO 01/094446 or WO 02/074870. When used alone, the fluorinated resin typically includes functional groups that capable of reacting with functional groups, e.g. hydroxy groups, of the tie-coat layer.

Particular Embodiments of the Method of the Invention

In view of the above, the present invention in one variant in particular provides the method defined above, wherein the binder phase comprises amino-functional polysiloxane(s) and epoxy-functional polysiloxane(s).

In particular, the binder phase of the coating composition comprises amino-functional polysiloxane(s), epoxy-functional polysiloxane(s), and adhesion promoting agent(s).

In one embodiment hereof, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

15-60%, such as 15-50%, by wet weight of amino-functional polysiloxane(s), 25-90%, such as 30-90%, e.g. 40-90% by wet weight of epoxy-functional polysiloxane(s), and 0-20% or 0.1-20%, such as 0.1-15%, such as 0.5-10%, by wet weight of adhesion promoting agent(s), wherein the ratio between the hydrogen equivalents of the amino-functional polysiloxane(s) and the epoxy equivalents of the epoxy-functional polysitoxane(s) is in the range of 40:100 to 200:100; and (B) applying a second polysiloxane-based coating composition onto said tie-coat thereby establishing a fouling release coating on said substrate.

In another embodiment hereof, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

2-60%, such as 5-55%, by wet weight of a combination of amino-functional polysiloxane(s) and aminosilane(s), 25-90%, such as 30-90%, e.g. 40-90% by wet weight of epoxy-functional polysiloxane(s), and 0-20% or 0.1-20%, such as 0.1-15%, such as 0.5-10%, by wet weight of adhesion promoting agent(s), wherein the ratio between the hydrogen equivalents of the amino-functional polysiloxane(s)/aminosilane(s) and the epoxy equivalents of the epoxy-functional polysiloxane(s) is in the range of 20:100 to 200:100; and (B) applying a second polysiloxane-based coating composition onto said tie-coat thereby establishing a fouling release coating on said substrate.

In still another embodiment hereof, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

15-60%, such as 15-50%, by wet weight of amino-functional polysiloxane(s), 2-90%, such as 5-85%, by wet weight of a combination of epoxy-functional polysiloxane(s) and epoxysilane(s), and 0-20% or 0.1-20%, such as 0.1-15%, such as 0.5-10%, by wet weight of adhesion promoting agent(s), wherein the ratio between the hydrogen equivalents of the amino-functional polysiloxane(s) and the epoxy equivalents of the epoxy-functional polysiloxane(s)/epoxysilane(s) is in the range of 40:100 to 200:100; and (B) applying a second polysiloxane-based coating composition onto said tie-coat thereby establishing a fouling release coating on said substrate.

In still another embodiment hereof, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

2-60%, such as 5-55%, by wet weight of a combination of amino-functional polysiloxane(s) and aminosilane(s), 2-90%, such as 5-85%, by wet weight of a combination of epoxy-functional polysiloxane(s) and epoxysilane(s), and 0-20% or 0.1-20%, such as 0.1-15%, such as 0.5-10%, by wet weight of adhesion promoting agent(s), wherein the ratio between the hydrogen equivalents of the amino-functional polysiloxane(s)/aminosilane(s) and the epoxy equivalents of the epoxy-functional polysiloxane(s)/epoxysilane(s) is in the range of 20:100 to 200:100; and (B) applying a second polysiloxane-based coating composition onto said tie-coat thereby establishing a fouling release coating on said substrate.

In another variant, the invention provides the method defined herein, wherein the binder phase of the coating composition comprises amino-functional polysiloxane(s), epoxy-functional polysiloxane(s), and the combination of one or more amino-functional compounds of non-silicon origin and one or more epoxy-functional compounds of non-silicon origin (i.e. an epoxy paint composition). In particular, the binder phase of the coating composition comprises amino-functional polysiloxane(s), epoxy-functional polysiloxane(s), adhesion promoting agent(s), and the combination of one or more amino-functional compounds of non-silicon origin and one or more epoxy-functional compounds of non-silicon origin (i.e. an epoxy paint composition).

In one embodiment hereof, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

2-50%, such as 2-30% by wet weight of amino-functional polysiloxane(s), epoxy-functional polysiloxane(s), and optionally amino-silane(s) and epoxy-silane(s); and 10-80%, such as 30-55% by wet weight of the combination of one or more amino-functional compounds of non-silicon origin and one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 20:100 to 200:100; and (B) applying a second polysiloxane-based coating composition onto said tie-coat thereby establishing a fouling release coating on said substrate.

In a further embodiment, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

2-50%, such as 2-30% by wet weight of amino-functional polysiloxane(s), epoxy-functional polysiloxane(s), adhesion promoting agent(s), and optionally amino-silane(s) and epoxy-silane(s); and 10-80%, such as 30-55% by wet weight of the combination of one or more amino-functional compounds of non-silicon origin and one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 20:100 to 200:100; and (B) applying a second polysiloxane-based coating composition onto said tie-coat thereby establishing a fouling release coating on said substrate.

In another variant, the present invention in particular provides the method defined above, wherein the binder phase of the coating composition comprises amino-functional polysiloxane(s), epoxy-functional silane(s), and adhesion promoting agent(s).

In one embodiment hereof, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

15-60%, such as 15-50%, by wet weight of amino-functional polysiloxane(s), 1-60% by wet weight of epoxysilane(s), and 0.1-15%, such as 0.5-10%, by wet weight of adhesion promoting agent(s), wherein the ratio between the hydrogen equivalents of the amino-functional polysiloxane(s) and the epoxy equivalents of the epoxysilane(s) is in the range of 40:100 to 200:100; and (B) applying a second polysiloxane-based coating composition onto said tie-coat thereby establishing a fouling release coating on said substrate.

In another embodiment hereof, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

2-60%, such as 5-55%, by wet weight of a combination of amino-functional polysiloxane(s) and aminosilane(s), 1-60% by wet weight of epoxysilane(s), and 0.1-15%, such as 0.5-10%, by wet weight of adhesion promoting agent(s), wherein the ratio between the hydrogen equivalents of the amino-functional polysiloxane(s)/aminosilane(s) and the epoxy equivalents of the epoxysilane(s) is in the range of 20:100 to 200:100; and (B) applying a second polysiloxane-based coating composition onto said tie-coat thereby establishing a fouling release coating on said substrate.

In a still further variant of the method of the invention, the binder phase of the coating composition comprises the combination of one or more amino-functional compounds of non-silicon origin and one or more epoxy-functional compounds of non-silicon origin (i.e. an epoxy paint composition).

In one embodiment hereof, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

2-50%, such as 2-30% by wet weight of amino-functional polysiloxane(s), epoxy-silane(s), adhesion promoting agent(s), and optionally amino-silane(s); and 10-80%, such as 30-55% by wet weight of the combination of one or more amino-functional compounds of non-silicon origin and one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 20:100 to 200:100; and (B) applying a second polysiloxane-based coating composition onto said tie-coat thereby establishing a fouling release coating on said substrate.

In another variant, the present invention in particular provides the method defined above, wherein the binder phase of the coating composition comprises amino-functional silane(s), epoxy-functional polysiloxane(s), and adhesion promoting agent(s).

In one embodiment hereof, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

1-30%, such as 1-20%, by wet weight of aminosilane(s), 25-90%, such as 30-90%, e.g. 40-90% by wet weight of epoxy-functional polysiloxane(s), and 0.1-15%, such as 0.5-10%, by wet weight of adhesion promoting agent(s), wherein the ratio between the hydrogen equivalents of the aminosilane(s) and the epoxy equivalents of the epoxy-functional polysiloxane(s) is in the range of 20:100 to 75:100, such as 20:100 to 49:100; and (B) applying a second polysiloxane-based coating composition onto said tie-coat thereby establishing a fouling release coating on said substrate.

In another embodiment hereof, the invention provides a method as defined above coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

1-30%, such as 1-20%, by wet weight of aminosilane(s), 2-90%, such as 5-85%, by wet weight of a combination of epoxy-functional polysiloxane(s) and epoxysilane(s), and 0.1-15%, such as 0.5-10%, by wet weight of adhesion promoting agent(s), wherein the ratio between the hydrogen equivalents of the aminosilane(s) and the epoxy equivalents of the epoxy-functional polysiloxane(s)/epoxysilane(s) is in the range of 20:100 to 75:100, such as 20:100 to 49:100; and (B) applying a second polysiloxane-based coating composition onto said tie-coat thereby establishing a fouling release coating on said substrate.

In a still further variant, the binder phase of the coating composition comprises the combination of one or more amino-functional compounds of non-silicon origin and one or more epoxy-functional compounds of non-silicon origin (i.e. an epoxy paint composition).

In one embodiment hereof, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

2-50%, such as 2-30% by wet weight of amino-silane(s), epoxy-functional polysiloxane(s), adhesion promoting agent(s), and optionally epoxy-silane(s); and 10-80%, such as 30-55% by wet weight of the combination of one or more amino-functional compounds of non-silicon origin and one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 20:100 to 200:100; and (B) applying a second polysiloxane-based coating composition onto said tie-coat thereby establishing a fouling release coating on said substrate.

In a still further variant, the binder phase of the coating composition comprises amino-functional polysiloxane(s), adhesion promoting agent(s), and the combination of one or more amino-functional compounds of non-silicon origin and one or more epoxy-functional compounds of non-silicon origin (i.e. an epoxy paint composition).

In one embodiment hereof, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

2-50%, such as 2-30% by wet weight of amino-functional polysiloxane(s), adhesion promoting agent(s), and optionally amino-silane(s) and epoxy-silane(s); and 10-80%, such as 30-55% by wet weight of the combination of one or more amino-functional compounds of non-silicon origin and one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 20:100 to 200:100; and (B) applying a second polysiloxane-based coating composition onto said tie-coat thereby establishing a fouling release coating on said substrate.

In still another variant, the binder phase of the coating composition comprises epoxy-functional polysiloxane(s), adhesion promoting agent(s), and the combination of one or more amino-functional compounds of non-silicon origin and one or more epoxy-functional compounds of non-silicon origin (i.e. an epoxy paint composition).

In one embodiment hereof, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

2-50%, such as 2-30% by wet weight of epoxy-functional polysiloxane(s), adhesion promoting agent(s), and optionally amino-silane(s) and epoxy-silane(s); and 10-80%, such as 30-55% by wet weight of the combination of one or more amino-functional compounds of non-silicon origin and one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 20:100 to 200: 100; and (B) applying a second polysiloxane-based coating composition onto said tie-coat thereby establishing a fouling release coating on said substrate.

In a still further interesting variant, the binder phase of the coating composition comprises amino-functional polysiloxane(s), adhesion promoting agent(s), and epoxy-functional compound(s) of non-silicon origin.

In one embodiment hereof, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

2-50%, such as 2-30% by wet weight of amino-functional polysiloxane(s), adhesion promoting agent(s), and optionally amino-silane(s) and epoxy-silane(s); and 10-80%, such as 30-55% by wet weight of one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 20:100 to 200:100; and (B) applying a second polysiloxane-based coating composition onto said tie-coat thereby establishing a fouling release coating on said substrate.

In a still further interesting variant, the binder phase of the coating composition comprises amino-functional polysiloxane(s), epoxy-functional polysiloxane(s), adhesion promoting agent(s), and epoxy-functional compound(s) of non-silicon origin.

In one embodiment hereof, the invention provides a method as defined above of coating a metal substrate coated with an anticorrosive epoxy-based coating, the method comprising:

(A) applying a coating composition to at least a part of said anticorrosive coating thereby establishing a tie-coat on said substrate, wherein said coating composition comprises (i) 5-45%, such as 5-40% by wet weight of pigments and fillers; and (ii) the balance of a binder phase comprising:

2-50%, such as 2-30% by wet weight of amino-functional polysiloxane(s), epoxy-functional polysiloxane(s), adhesion promoting agent(s), and optionally amino-silane(s) and epoxy-silane(s); and 10-80%, such as 30-55% by wet weight of one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 20:100 to 200:100; and (B) applying a second polysiloxane-based coating composition onto said tie-coat thereby establishing a fouling release coating on said substrate.

In all of the above particular embodiments of the method of the invention, the adhesion promoting agent(s) is/are preferably selected from the group consisting of hydroxy-functional polysiloxanes, hydroxyalkyl-functional polysiloxanes and $C_{1-4}$-alkoxy-functional polysiloxanes, in particular from hydroxy-functional polysiloxanes and $C_{1-4}$-alkoxy-functional polysiloxanes, It is envisaged that each and every of the above particular embodiments of the method of the invention may be equally applicable for glass-fibre substrates. In such cases, however, the anticorrosive epoxy-based coating may, if desirable, be substituted with another epoxy primer coating which may not necessarily have the same anticorrosive properties.

Coating Composition

It is believed that the polysiloxane coating composition defined herein for the method of the invention is novel as such. Thus, a further aspect of the invention relates to a coating composition, said coating composition comprises (i) 0-60%, such as 0-50%, preferably 5-45%, such as 5-40% or 5-35% by wet weight of pigments and fillers; and (ii) the balance of a binder phase comprising:

1-90% by wet weight of one or more amino-functional compounds, 1-90% by wet weight of one or more epoxy-functional compounds, and 0-20% by wet weight of one or more adhesion promoting agents;

wherein the binder phase comprises at least two types, (a), (b), (c), of polysiloxane compounds selected from the group consisting of:

(a) amino-functional polysiloxanes;
(b) epoxy-functional polysiloxanes; and
(c) adhesion promoting agents selected from the group consisting of hydroxy-functional polysiloxanes, hydroxyalkyl-functional polysiloxanes and $C_{1-4}$-alkoxy-functional polysiloxanes.

In one particularly preferred embodiment, the ratio between the hydrogen equivalents of the amino-functional compound(s) and the epoxy equivalents of the epoxy-functional compound(s) is in the range of 20:100 to 200:100.

In one embodiment, the binder phase of the coating composition comprises one or more adhesion promoting agents as defined above. As above, the adhesion promoting agent(s) is/are preferably selected from the group consisting of hydroxy-functional polysiloxanes and $C_{1-4}$-alkoxy-functional polysiloxanes. Typically, the binder phase comprises 0.1-15% by wet weight of the adhesion promoting agent(s).

The coating composition may further, as a part of the binder phase, comprise solvents and additives.

Examples of solvents are aliphatic, cycloaliphatic and aromatic hydrocarbons such as white spirit, cyclohexane, toluene, octamethyltrisiloxane, xylene and naphtha solventesters such as methoxypropyl acetate, n-butyl acetate and 2-ethoxyethyl acetate; and mixtures thereof.

Another possible embodiment is that where the epoxy-functional silicon compound is an epoxy-functional polysiloxane and the amino-functional silicon compound is an amino-functional polysiloxane, and where the solvent (or dispersant) is water or a water/solvent mixture, e.g. water/ethanol.

Examples of additives are:

(i) plasticizers such as chlorinated paraffin; hydrocarbons or modified hydrocarbons, e.g. modified aromatic hydrocarbon resins such as modified phenol and alpha-methylstyrene based hydrocarbons; phthalates such as dibutyl phthalate, benzylbutyl phthalate, dioctyl phthalate, diisononyl phthalate and diisodecyl phthalate; phosphate esters such as tricresyl phosphate; sulfonamides, alkyl-p-toluene sulfonamide; adipates such as bis(2-ethylhexyl)-adipate), diisobutyl adipate and dioctyladipate; phosphoric acid triethyl ester; butyl stearate; sorbitan trioleate; and non-reactive organopolysiloxanes;

(ii) surfactants such as derivatives of propylene oxide or ethylene oxide such as alkylphenol-ethylene oxide condensates; ethoxylated monoethanolamides of unsaturated fatty acids such as ethoxylated monoethanolamides of linoleic acid; sodium dodecyl sulfate; alkylphenol ethoxylates; and soya lecithin;

(iii) wetting agents and dispersants such as those described in M. Ash and I. Ash, "Handbook of Paint and Coating Raw Materials, Vol. 1", 1996, Gower Publ. Ltd., Great Britain, pp 821-823 and 849-851;

(iv) defoaming agents such as silicone oils;

(v) stabilisers such as stabilisers against light and heat, e.g. hindered amine light stabilisers (HALS), UV-absorbers such as hydroxyphenyl benzotriazole-type and hydroxyphenyl triazine-type compounds, 2-hydroxy-4-methoxybenzophenone, 2-(5-chloro-(2H)-benzotriazol-2-yl)-4-methyl-6-(tert-butyl)phenol, and 2,4-ditert-butyl-6-(5-chlorobenzotriazol-2-yl)phenol; stabilisers against moisture such as molecular sieves or water scavengers such as synthetic zeolites, substituted isocyanates, substituted silanes and ortho formic acid triethyl ester; stabilisers against oxidation such as butylated hydroxyanisole; butylated hydroxytoluene; propylgallate; tocopherols; 2,5-di-tert-butyl-hydroquinone; L-ascorbyl palmitate; carotenes; vitamin A;

(vi) inhibitors against corrosion such as aminocarboxylates, calcium silicophosphate, ammonium benzoate, barium/calcium/zinc/magnesium salts of alkylnaphthalene sulfonic acids, zinc phosphate; zinc metaborate;

(vii) coalescing agents such as glycols, 2-butoxy ethanol, and 2,2,4-trimethyl-1,3-pentanediol monoisobutyrate;

(viii) thickeners and anti-settling agents such as colloidal silica, hydrated aluminium silicate (bentonite), aluminium-tristearate, aluminiummonostearate, xanthan gum, chrysotile, pyrogenic silica, hydrogenated castor oil, organo-modified clays, polyamide waxes and polyethylene waxes; and (ix) dyes such as 1,4-bis(butylamino)anthraquinone and other anthraquinone derivatives; toluidine dyes, etc.

Furthermore, the coating composition may comprise pigments and fillers.

Pigments and fillers are in the present context viewed in conjunction as constituents that may be added to the coating composition with only limited implications on the adhesion properties. "Pigments" are normally characterised in that they render the final paint coating non-transparent and non-translucent, whereas "fillers" normally are characterised in that they do not render the paint non-translucent and therefore do not contribute significantly to hide any material below the coating.

Examples of pigments are grades of titanium dioxide, red iron oxide, zinc oxide, carbon black, graphite, yellow iron oxide, red molybdate, yellow molybdate, zinc sulfide, antimony oxide, sodium aluminium sulfosilicates, quinacridones, phthalocyanine blue, phthalocyanine green, black iron oxide, indanthrone blue, cobalt aluminium oxide, carbazole dioxazine, chromium oxide, isoindoline orange, bis-acetoacet-o-tolidiole, benzimidazolon, quinaphtalone yellow, isoindoline yellow, tetrachloroisoindolinone, quinophthalone yellow.

Examples of fillers are calcium carbonate such as calcite, dolomite, talc, mica, feldspar, barium sulfate, kaolin, nephelin, silica, perlite, magnesium oxide, and quartz flour, etc. Fillers (and pigments) may also be added in the form of fibres, thus, apart from the before-mentioned examples of fillers, the coating composition may also comprise fibres, e.g. those generally and specifically described in WO 00/77102 which is hereby incorporated by reference. At present, especially preferred are mineral fibres such as mineral-glass fibres, wollastonite fibres, montmorillonite fibres, tobermorite fibres, atapulgite fibres, calcined bauxite fibres, volcanic rock fibres, bauxite fibres, rockwool fibres, and processed mineral fibres from mineral wool.

Any pigments and/or fillers constitute 0-60%, such as 0-50%, preferably 5-45%, such as 5-40% or 5-35%, by wet weight of the coating composition. When present, the concentration of the fibres is normally in the range of 0.1-50%, e.g. 0.1-25% by wet weight of the coating composition, such as 0.5-10% by wet weight of the coating composition. Especially relevant concentrations of fibres, depending upon the type and size of the fibres, may be 1-10% or 2-10%, such as 2-7%, or 3-10%, such as 3-8% by wet weight of the coating composition. It should be understood that the above ranges refer to the total amount of fibres, thus, in the case where two or more fibre types are utilised, the combined amounts should fall within the above ranges.

The coating compositions may be prepared by conventional method using equipment known to the person skilled in the art, e.g. utilising mixers, ball mills, grinders, filters, etc. The coating compositions are typically prepared and shipped as two- or three-component systems that should be combined and thoroughly mixed immediately prior to use. When an adhesion promoting agent is included in the coating composition, a three-component system is typically preferred. An example of a suitable preparation method is described in the Examples.

Particular Embodiments of the Coating Composition of the Invention

In one variant of the coating composition defined herein the binder phase comprises amino-functional polysiloxane(s) and epoxy-functional polysiloxane(s).

In a more specific variant of the coating composition, the binder phase of the coating composition comprises amino-functional polysiloxane(s), epoxy-functional polysiloxane(s), and adhesion promoting agent(s).

In one interesting embodiment hereof, the coating composition comprises (i) 5-45%, such as 5-40% by wet weight of pigments and fillers; and (ii) the balance of a binder phase comprising:

15-60%, such as 15-50%, by wet weight of amino-functional polysiloxane(s), 25-90%, such as 30-90%, e.g. 40-90% by wet weight of epoxy-functional polysiloxane(s), and 0-20% or 0.1-20%, such as 0.1-15%, such as 0.5-10%, by wet weight of adhesion promoting agent(s), wherein the ratio between the hydrogen equivalents of the amino-functional polysiloxan(s) and the epoxy equivalents of the epoxy-functional polysiloxane(s) is in the range of 40:100 to 200:100.

In another interesting embodiment hereof, the coating composition comprises (i) 5-45%, such as 5-40% by wet weight of pigments and fillers; and (ii) the balance of a binder phase comprising:

2-60%, such as 5-55%, by wet weight of a combination of amino-functional polysiloxane(s) and aminosilane(s), 25-90%, such as 30-90%, e.g. 40-90% by wet weight of epoxy-functional polysiloxane(s), and 0-20% or 0.1-20%, such as 0.1-15%, such as 0.5-10%, by wet weight of adhesion promoting agent(s), wherein the ratio between the hydrogen equivalents of the amino-functional polysiloxane(s)/aminosilane(s) and the epoxy equivalents of the epoxy-functional polysiloxane(s) is in the range of 20:100 to 200:100.

In still another embodiment hereof, the coating composition comprises (i) 5-45%, such as 5-40% by wet weight of pigments and fillers; and (ii) the balance of a binder phase comprising:

15-60%, such as 15-50%, by wet weight of amino-functional polysiloxane(s), 2-90%, such as 5-85%, by wet weight of a combination of epoxy-functional polysiloxane(s) and epoxysilane(s), and 0-20% or 0.1-20%, such as 0.1-15%, such as 0.5-10%, by wet weight of adhesion promoting agent(s), wherein the ratio between the hydrogen equivalents of the amino-functional polysiloxane(s) and the epoxy equivalents of the epoxy-functional polysiloxane(s)/epoxysilane(s) is in the range of 40:100 to 200:100.

In still another embodiment hereof, the coating composition comprises (i) 5-45%, such as 5-40% by wet weight of pigments and fillers; and (ii) the balance of a binder phase comprising:

2-60%, such as 5-55%, by wet weight of a combination of amino-functional polysiloxane(s) and aminosilane(s), 2-90%, such as 5-85%, by wet weight of a combination of epoxy-functional polysiloxane(s) and epoxysilane(s), and 0-20% or 0.1-20%, such as 0.1-15%, such as 0.5-10%, by wet weight of adhesion promoting agent(s), wherein the ratio between the hydrogen equivalents of the amino-functional polysiloxane(s)/aminosilane(s) and the epoxy equivalents of the epoxy-functional polysiloxane(s)/epoxysilane(s) is in the range of 20:100 to 200:100.

In a further variant, the binder phase of the coating composition comprises amino-functional polysiloxane(s), epoxy-functional polysiloxane(s), and the combination of one or more amino-functional compound(s) of non-silicon origin and epoxy-functional compound(s) of non-silicon origin (i.e. an epoxy paint composition). In particular, the binder phase of the coating composition comprises amino-functional polysiloxane(s), epoxy-functional polysiloxane(s), adhesion promoting agent(s), and the combination of one or more amino-functional compound(s) of non-silicon origin and one or more epoxy-functional compound(s) of non-silicon origin (i.e. an epoxy paint composition).

In one embodiment hereof, the coating composition comprises (i) 5-45%, such as 5-40% by wet weight of pigments and fillers; and (ii) the balance of a binder phase comprising:

2-50%, such as 2-30% by wet weight of amino-functional polysiloxane(s), epoxy-functional polysiloxane(s), and optionally amino-silane(s) and epoxy-silane(s); and 10-80%, such as 30-55% by wet weight of the combination of one or more amino-functional compounds of non-silicon origin and one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 40:100 to 200:100.

In a further embodiment hereof, the coating composition comprises (i) 5-45%, such as 5-40% by wet weight of pigments and fillers; and (ii) the balance of a binder phase comprising:

2-50%, such as 2-30% by wet weight of amino-functional polysiloxane(s), epoxy-functional polysiloxane(s), adhesion promoting agent(s), and optionally amino-silane(s) and epoxy-silane(s); and 10-80%, such as 30-55% by wet weight of the combination of one or more amino-functional compounds of non-silicon origin and one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 40:100 to 200:100.

In another variant of the coating composition, the binder phase of the coating composition comprises amino-functional polysiloxane(s), epoxy-functional silane(s), and adhesion promoting agent(s).

In one embodiment hereof, the coating composition comprises (i) 5-45%, such as 5-40% by wet weight of pigments and fillers; and (ii) the balance of a binder phase comprising:

15-60%, such as 15-50%, by wet weight of amino-functional polysiloxane(s), 1-60% by wet weight of epoxysilane(s), and 0.1-15%, such as 0.5-10%, by wet weight of adhesion promoting agent(s), wherein the ratio between the hydrogen equivalents of the amino-functional polysiloxane(s) and the epoxy equivalents of the epoxysilane(s) is in the range of 40:100 to 200:100.

In one embodiment hereof, the coating composition comprises (i) 5-45%, such as 5-40% by wet weight of pigments and fillers; and (ii) the balance of a binder phase comprising:

2-60%, such as 5-55%, by wet weight of a combination of amino-functional polysiloxane(s) and aminosilane(s), 1-60% by wet weight of epoxysilane(s), and 0.1-15%, such as 0.5-10%, by wet weight of adhesion promoting agent(s), wherein the ratio between the hydrogen equivalents of the amino-functional polysiloxane(s)/aminosilane(s) and the epoxy equivalents of the epoxysilane(s) is in the range of 20:100 to 200:100.

In a still further variant, the binder phase of the coating composition further comprises the combination of one or more amino-functional compound(s) of non-silicon origin and one or more epoxy-functional compound(s) of non-silicon origin. (i.e. an epoxy paint composition).

In one embodiment hereof, the coating composition comprises (i) 5-45%, such as 5-40% by wet weight of pigments and fillers; and (ii) the balance of a binder phase comprising:

2-50%, such as 2-30% by wet weight of amino-functional polysiloxane(s), epoxy-silane(s), adhesion promoting agent(s), and optionally amino-silane(s); and 10-80%, such as 30-55% by wet weight of the combination of one or more amino-functional compounds of non-silicon origin and one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 40:100 to 200:100.

In still another variant of the coating composition, the binder phase of the coating composition comprises amino-functional silane(s), epoxy-functional polysiloxane(s), and adhesion promoting agent(s).

In one embodiment hereof, the coating composition comprises (i) 5-45%, such as 5-40% by wet weight of pigments and fillers; and (ii) the balance of a binder phase comprising:

1-30%, such as 1-20%, by wet weight of aminosilane(s), 25-90%, such as 30-90%, e.g. 40-90% by wet weight of epoxy-functional polysiloxane(s), and 0.1-15%, such as 0.5-10%, by wet weight of adhesion promoting agent(s), wherein the ratio between the hydrogen equivalents of the aminosilane(s) and the epoxy equivalents of the epoxy-functional polysiloxane(s) is in the range of 20:100 to 75:100, such as 20:100 to 49:100.

In another embodiment hereof, the coating composition comprises (i) 5-45%, such as 5-40% by wet weight of pigments and fillers; and (ii) the balance of a binder phase comprising:

1-30%, such as 1-20%, by wet weight of aminosilane(s), 2-90%, such as 5-85%, by wet weight of a combination of epoxy-functional polysiloxane(s) and epoxysilane(s), and 0.1-15%, such as 0.5-10%, by wet weight of adhesion promoting agent(s), wherein the ratio between the hydrogen equivalents of the aminosilane(s) and the epoxy equivalents of the epoxy-functional polysiloxane(s)/epoxysilane(s) is in the range of 20:100 to 75:100, such as 20:100 to 49:100.

In a still further variant, the binder phase of the coating composition further comprises the combination of one or more amino-functional compounds of non-silicon origin and one or more epoxy-functional compounds of non-silicon origin (i.e. an epoxy paint composition).

In one embodiment, the coating composition comprises (i) 5-45%, such as 5-40% by wet weight of pigments and fillers; and (ii) the balance of a binder phase comprising:

2-50%, such as 2-30% by wet weight of amino-silane(s), epoxy-functional polysiloxane(s), adhesion promoting agent(s), and optionally epoxy-silane(s); and 10-80%, such as 30-55% by wet weight of the combination of one or more amino-functional compounds of non-silicon origin and one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 40:100 to 200:100.

In still another variant of the coating composition, the binder phase of the coating composition comprises amino-functional polysiloxane(s), adhesion promoting agent(s), and the combination of one or more amino-functional compounds of non-silicon origin and one or more epoxy-functional compounds of non-silicon origin (i.e. an epoxy paint composition).

In still another embodiment, the coating composition comprises (i) 5-45%, such as 5-40% by wet weight of pigments and fillers; and (ii) the balance of a binder phase comprising:

2-50%, such as 2-30% by wet weight of amino-functional polysiloxane(s), adhesion promoting agent(s), and optionally amino-silane(s) and epoxy-silane(s); and 10-80%, such as 30-55% by wet weight of the combination of one or more amino-functional compounds of non-silicon origin and one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 40:100 to 200:100.

In still another variant of the coating composition, the binder phase of the coating composition comprises epoxy-functional polysiloxane(s), adhesion promoting agent(s), and the combination of one or more amino-functional compounds of non-silicon origin and one or more epoxy-functional compounds of non-silicon origin (i.e. an epoxy paint composition).

In still another embodiment, the coating composition comprises (i) 5-45%, such as 5-40% by wet weight of pigments and fillers; and (ii) the balance of a binder phase comprising:

2-50%, such as 2-30% by wet weight of epoxy-functional polysiloxane(s), adhesion promoting agent(s), and optionally amino-silane(s) and epoxy-silane(s); and 10-80%, such as 30-55% by wet weight of the combination of one or more amino-functional compounds of non-silicon origin and one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 40:100 to 200:100.

In a still further interesting variant, the binder phase of the coating composition comprises amino-functional polysiloxane(s), adhesion promoting agent(s), and epoxy-functional compound(s) of non-silicon origin.

In one embodiment hereof, the coating composition comprises (i) 5-45%, such as 5-40% by wet weight of pigments and fillers; and (ii) the balance of a binder phase comprising:

2-50%, such as 2-30% by wet weight of amino-functional polysiloxane(s), adhesion promoting agent(s), and optionally amino-silane(s) and epoxy-silane(s); and 10-80%, such as 30-55% by wet weight of one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 40:100 to 200:100.

In a still further interesting variant, the binder phase of the coating composition comprises amino-functional polysiloxane(s), epoxy-functional polysiloxane(s), adhesion promoting agent(s), and epoxy-functional compound(s) of non-silicon origin.

In one embodiment hereof, the coating composition comprises (i) 5-45%, such as 5-40% by wet weight of pigments and fillers; and (ii) the balance of a binder phase comprising:

2-50%, such as 2-30% by wet weight of amino-functional polysiloxane(s), epoxy-functional polysiloxane(s), adhesion promoting agent(s), and optionally amino-silane(s) and epoxy-silane(s); and 10-80%, such as 30-55% by wet weight of one or more epoxy-functional compounds of non-silicon origin, wherein the ratio between the hydrogen equivalents of the amino-functional polysiloxane(s) and the epoxy equivalents of the epoxy-functional polysiloxane(s)/epoxysilane(s) is in the range of 40:100 to 200:100.

In all of the above particular embodiments of the coating composition of the invention, the adhesion promoting agent(s) is/are preferably selected from the group consisting of hydroxy-functional polysiloxanes, hydroxyalkyl-functional polysiloxanes and $C_{1-4}$-alkoxy-functional polysiloxanes, in particular from hydroxy-functional polysiloxanes and $C_{1-4}$-alkoxy-functional polysiloxanes, It is envisaged that each and every of the above particular embodiments of coating composition of the invention may be equally applicable for glass-fibre substrates. In such cases, however, the anticorrosive epoxy-based coating may, if desirable, be substituted with another epoxy primer coating which may not necessarily have the same anticorrosive properties.

An Article

Another aspect of the invention relates to an article comprising a substrate, an epoxy-based coating on at least a part of the surface of said substrate, a tie-coat on said epoxy-based coating, and a fouling release coating on said tie-coat, wherein said tie-coat is as defined hereinabove.

The coating composition, the method of establishing the coating on the substrate surface, and the characteristics of the coating follow the directions given hereinabove.

In one embodiment, the fouling release coating is a second polysiloxane-based coating.

In one particular embodiment of the above article, the anticorrosive layer has a total dry film thickness of 100-600 μm, such as 150-450 μm, e.g. 200-400 μm; the tie-coat has a total dry film thickness of 20-500 μm, such as 20-400 μm, e.g. 50-300 μm; and the fouling release coating has a total dry film thickness of 20-500 μm, such as 20-400 μm, e.g. 50-300 μm.

In another particular embodiment of the above article, the anticorrosive layer has a total dry film thickness of 100-600 μm, such as 150-450 μm, e.g. 200-400 μm; the tie-coat has a total dry film thickness of 50-900 μm, such as 50-750 μm, e.g. 100-600 μm or 100-400 μm; and the fouling release coating has a total dry film thickness of 20-500 μm, such as 20-400 μm, e.g. 50-300 μm.

A further embodiment of the article is that where the article is coated with a paint system comprising a total dry film thickness of 150-400 μm of an anticorrosive layer of an epoxy-based coating established by application of 2-4 layers;

a total dry film thickness of 20-400 μm of the tie-coat established by application of 1-2 layers; and a total dry film thickness of 20-400 μm of the fouling release coating established by application of 1-2 layers. In particular, the anticorrosive layer is established by application of 1-3 layers of a first epoxy-based coating and 1-2 layers of a second epoxy-based coating, said first epoxy-based coating and said second epoxy-based coating not being identical.

More particular embodiments thereof are those where the paint system comprises:

a total dry film thickness of 150-400 μm of an anticorrosive layer of an epoxy-based coating established by application of 2-3, preferably 3, layers;

a total dry film thickness of 50-300 μm of the tie-coat established by application of 1-2 layers; and a total dry film thickness of 50-300 μm of the fouling release coating established by application of 1-2, preferably 1, layer(s); or a total dry film thickness of 150-350 μm of an anticorrosive layer of an epoxy-based coating established by application of 1-2, preferably 2, layers;

a total dry film thickness of 100-600 μm, or 100-400 μm, of the tie-coat established by application of 1-2, preferably 2, layers; and a total dry film thickness of 50-300 μm of the fouling release coating established by application of 1-2, preferably 1, layer(s); or a total dry film thickness of 50-250 μm of an anticorrosive layer of an epoxy-based coating established by application of 1-2, preferably 1, layer(s);

a total dry film thickness of 100-750 μm of the tie-coat established by application of 1-3, preferably 1-2 layers; and a total dry film thickness of 50-300 μm of the fouling release coating established by application of 1-2, preferably 1, layer(s); or a total dry film thickness of 100-900 μm of the tie-coat established by application of 1-3, preferably 1-2 layers; and a total dry film thickness of 50-300 μm of the fouling release coating established by application of 1-2, preferably 1, layer(s).

General Remarks

Although the present description and claims occasionally refer to an epoxy-functional silicon compound, an epoxy-functional polysiloxane, an epoxysilane, an amino-functional silicon compounds, an amino-functional polysiloxane, an aminosilane, an adhesion promoting agent, etc., it should be understood that the coating compositions defined herein may comprise one, two or more types of the individual constituents. In such embodiments, the total amount of the respective constituent (e.g. aminosilanes) should correspond to the amount defined above for the individual constituent.

The "(s)" in the expressions: compound(s), polysiloxane(s), silane(s), agent(s), etc. indicates that one, two or more types of the individual constituents may be present.

On the other hand, when the expression "one" is used, only one (1) of the respective constituent is present.

The present invention is further illustrated by the following non-limiting examples.

EXAMPLES

The following experiments and tests (the adhesion test and the Droplet test) were conducted in order to determine the applicability of coating composition of the invention. It is believed that the Adhesion test must be passed in order for a coating to be useful for commercial purposes. On the other hand, the Droplet test indicates that a durable and permanent coating should be expected. For certain commercial products, e.g. for the yacht market, it is desirable that fouling release coatings and tie coats can be removed without the use of sand blasting e.g. with the use of a solvent based paint remover. Thus, for commercial products within this market segments, a "Fail" in the Droplet test is advantageous. In general, a "Fail" in the Droplet test is advantageous when the solid material onto which the coating composition is applied is unsuited for sandblasting. Solid material unsuited for sandblasting includes glass-fibre.

Materials

Silres 44100 is an amino functional polysiloxane from Wacker Chemie GmbH, Germany.

SF1708 is an aminofunctionalized polysiloxane fluid of GE silicones, 260 Hudson River Road, Waterlord, N.Y. 12188, USA.

Silikoftal ED is an epoxy functional polysiloxane, a product of Tego Chemie Service GmbH, Goldschmidtstrasse 100, D-45127 Essen, Germany.

Rhodorsil 48V100 is a hydroxy terminated fluid substantially comprising polyorganosiloxane parts, a product of Rhodia.

DC2-1273 is a hydroxy terminated fluid substantially comprising polyorganosiloxane parts from Dow Corning, USA.

Dynasylan AMEO is a 3-aminopropyltriethoxysilane from Degussa AG, Germany.

Dynasylan Glymo is a gamma glycidoxypropyl trimethoxysilane from Degussa AG, Germany.

Addid 900 is an amino functional trimethoxysilane from Wacker Chemie GmbH, Germany.

Hempadur 15570 is an anticorrosive epoxy paint from Hempel A/S.

Hempadur 45880 is an anticorrosive epoxy paint from Hempel A/S.

Amerlock 400 is an unfilled epoxy from Valspar Corp., 1101 Third Street South, Minneapolis, Minn. 55415.

ES-1002T is a silicone modified epoxy resin varnish from Shin-Etsu Chemical, Japan.

AMMO solution is a mixture of Dynasylan Ammo from Degussa AG, Germany, mixed with dibutyl tinoxide, ethyl silicate, and mineral spirit.

KE-45TS topcoat is a silicone rubber varnish from Shin-Etsu Chemical, Japan.

Titanium dioxide: Kemira X660, Kemira Pigments OY, Finland.

Percipitated barium sulphate: Blanc Fixe Super F, Sachtleben Germany.

Graphite: AF96/97, Graphitwerk Kropfm HL AG, Germany.

Talc: Luzenac 20 MO, Talc De Luzenac, France.

Bentonite: Bentone SD-2, Elementis Specialities, UK.

Black Iron oxide Bayferrox 318M, Bayer, Germany.

Extender pigment: aluminium, potassium, sodium silicate Minex S 20, North Cape Nefelin A/S, Norway.

Mineral fibres: synthetic silicate fibres, MS 600; Lapinus Fibres BV, Holland.

Epicoat 1001 is a bisphenol A type epoxy resin varnish (NV70%) from Badish Oil Company.

KBM 603 is an amino silane coupling agent from Shin-Etsu Chemical, Japan.

Sunmide X-2800 is a polyamide resin varnish from Sanwa Chemical Industry Co, Ltd, Japan.

Araldite GZ 7071X75CH is a bisphenol A epoxide ex. Huntsman Advanced Materials, Switzerland.

Solvents from local suppliers.

Methods

Preparation of Test Panels

Where not stated below the drying time and the conditions are as specified in the tables with the results.

Tin panels (210×300×0.3 mm) were first coated with 75-100 μm (dry film thickness, DFT) of a commercial anticorrosive epoxy paint (Hempadur 15570, from Hempel A/S) applied by air spraying or by a doctor blade hand applicator. After 24 hours of drying in the laboratory at the specified conditions, the anticorrosive paint was covered by the model paint, applied in 100-200 μm (dry film thickness, DFT) by air spraying or by a doctor blade hand applicator. Where applicable, a topcoat (either Hempasil 77100 from Hempel A/S or KE-45TS from Shin-Etsu Chemical) was applied in 100-200 μm (dry film thickness, DFT) by air spraying or by a doctor blade hand applicator after the specified time of drying at the specified conditions. The panels were dried the specified time at the specified conditions. The paint coats were allowed to dry and cure at 20° C. unless otherwise specified (Example 1).

The Adhesion Test

The adhesion of a coating formulation is tested by a finger peel test according to the following procedure. The tester attempts to remove the coating from the substrate/previous paint layer by peeling it off with the finger nail.

The coating is considered to pass the test if there is only a cohesive failure in the layer to be tested and no adhesive failure between the layer and the substrate/previous layer.

The coating is considered to fail if there is an adhesive failure between any layer and another layer or between the layer and the substrate.

The Droplet Test

The adhesion of a coating formulation is tested in accordance with ISO 2812-1, method 3 (spotting method). The final coat of a painted system is subjected to an appropriate number of drops of the test liquid (either acetyl acetone or xylene), each approximately 0.1 ml in volume. The panels are left for the specified time, allowing air free access to it. The adhesion of the area is tested by means of the adhesion test described above.

If not stated elsewhere, all components are given in grams.

Example 1

| | MODEL PAINTS | | | | | | | | | |
|---|---|---|---|---|---|---|---|---|---|---|
| | 105-5 | 105-4 | 105-3 | 105-2 | 105-15 | 105-14 | 105-13 | 105-6 | 105-7 | 2-51-1 |
| Component 1: Epoxy-functional polysiloxane | | | | | | | | | | |
| Silikoftal ED (B) | 55.2 | 55.2 | 55.2 | 55.2 | 55.2 | 55.2 | 55.2 | 55.2 | 55.2 | 65.7 |
| Additives | | | | | | | | | | |
| Leveling agents, defoaming agents, plasticizers, etc. | 4.9 | 4.9 | 4.9 | 4.9 | 4.9 | 4.9 | 4.9 | 4.9 | 4.9 | 7.8[A] |
| Pigments and fillers | | | | | | | | | | |
| Black iron oxide | 13.4 | 13.4 | 13.4 | 13.4 | 13.4 | 13.4 | 13.4 | 13.4 | 13.4 | 4.7 |
| Extender pigment | 14.6 | 14.6 | 14.6 | 14.6 | 14.6 | 14.6 | 14.6 | 14.6 | 14.6 | |
| Mineral fibres | 4.7 | 4.7 | 4.7 | 4.7 | 4.7 | 4.7 | 4.7 | 4.7 | 4.7 | |
| Solvents | | | | | | | | | | |
| Xylene | 7.1 | 7.1 | 7.1 | 7.1 | 7.1 | 7.1 | 7.1 | 7.1 | 7.1 | 3.9 |
| Total Component 1 | 99.9 | 99.9 | 99.9 | 99.9 | 99.9 | 99.9 | 99.9 | 99.9 | 99.9 | 82.1 |
| Component 2: Amino-functional silicon compound | | | | | | | | | | |
| Silres 44100 VP 90% solid (A) | 8.9 | 17.9 | 25.1 | 32.3 | 39.4 | | | | | 30.7 |
| Dynasilan AMEO(c) | | | | | | 6.8 | 10.2 | 13.6 | 27.2 | |
| Component 3: Adhesion promoting agent (C) | | | | | | | | | | |
| Rhodorsil H48V100 | 2.5 | 2.5 | 2.5 | 2.5 | 2.5 | 2.5 | 2.5 | 2.5 | 2.5 | |
| Total | 111.3 | 120.3 | 127.5 | 134.7 | 141.8 | 109.2 | 112.6 | 116.0 | 129.6 | 112.8 |
| PVC % | 17.4 | 15.9 | 14.8 | 13.9 | 13.1 | 17.4 | 16.6 | 15.8 | 13.5 | 1.1 |
| SVR % | 88.8 | 88.7 | 88.6 | 88.6 | 88.5 | 89.9 | 90.3 | 90.7 | 92.0 | 92.1 |
| % by wet weight of pigments and fillers. | 29.4 | 27.2 | 25.6 | 24.3 | 23.1 | 29.9 | 29.0 | 28.2 | 25.2 | 4.2 |
| % by wet weight of the binder phase of epoxy-functional polysiloxane. | 70.2 | 63.0 | 58.2 | 54.1 | 50.6 | 72.2 | 69.1 | 66.3 | 57.0 | 60.8 |
| % by wet weight of the binder phase of amino-functional silicon compound | 11.3 | 18.4 | 23.8 | 28.5 | 32.5 | 8.9 | 12.8 | 16.3 | 28.1 | 28.4 |
| % by wet weight of the adhesion promoting agent | 2.2 | 2.1 | 2.0 | 1.9 | 1.8 | 2.3 | 2.2 | 2.2 | 1.9 | 0.0 |
| Hydrogen Equivalents:Epoxy Equivalents | 30:100 | 60:100 | 84:100 | 108:100 | 132:100 | 50:100 | 75:100 | 100:100 | 200:100 | 86:100 |

[A]The mixture of additives included 6.7% by wet weight of a non-functional polydimethylsiloxane as a defoaming agent.

Preparation Method for the Model Paints 684 grams of component 1 were prepared in the following way:

The mill base (60 w/w % of the Silikoftal ED, black iron oxide pigment, extender pigment, synthetic silicate fibres, levelling agent, defoaming agent, 35 w/w % of the solvent) was premixed on a Diaf dissolver equipped with an impeller disc (70 mm. in diameter) in a 1 litre can for 15 minutes at 1000 rpm. The impeller disc was substituted with a Teflon disc (70 mm. in diameter). 500 grams of 3 mm. glass beads were added to the mill base and grinding was performed for 20 minutes at 2000 rpm.

The rest of the raw materials (the remaining 40 w/w % of the Silikoftal ED, plasticizer, the remaining 65 w/w% of the solvent) were added and the composition was mixed at 1000 rpm. for 15 minutes. The paint base was separated from the glass beads by filtration.

Just before the application, the amino-functional silicon compound and the adhesion promoting agent (hydroxyl-functional silicone oil) were added.

Results

| Adhesion to anticorrosive epoxy paint when dried and cured at 5° C. (top coat not applied) | | | | | | | | | | |
|---|---|---|---|---|---|---|---|---|---|---|
| Epoxy paint | Adhesion evaluated after: | Model Paints | | | | | | | | |
| overcoated after: (hours) | (hours and conditions) | 105-5 | 105-4 | 105-3 | 105-2 | 105-15 | 105-14 | 105-13 | 105-6 | 105-7 |
| 24 | 24 | Pass* | Pass | Pass | Pass | Pass | Pass | Pass | Pass | Pass |
| 24 | 24 immersed | Pass | Pass | Pass | Pass | Pass | Pass | Pass | Pass | Pass |

*Tacky

The results show that the coating compositions of the invention exhibit excellent adhesion to epoxy-based anticorrosive coatings.

| Adhesion of the fouling release top coat to the model paints when dried and cured at 5° C. | | | | | | | | | | |
|---|---|---|---|---|---|---|---|---|---|---|
| Model paint | Adhesion evaluated after: | Model Paints | | | | | | | | |
| overcoated after: (hours) | (hours and conditions) | 105-5 | 105-4 | 105-3 | 105-2 | 105-15 | 105-14 | 105-13 | 105-6 | 105-7 |
| 24 | 24 immersed | Fail* | Pass | Pass | Pass | Pass | Pass | Fail | Fail | Fail |
| 30 | 24 | Fail | Fail | Fail | Pass | Pass | Pass | Pass | Pass | Fail |
| 30 | 24 immersed | Fail | Pass | Pass | Pass | Pass | Pass | Fail | Fail | Fail |

*Tacky when overcoated.

| Adhesion to anticorrosive epoxy paint when dried and cured at 10° C., 80% relative humidity. (Top coat not applied) | | | | | | | | | | |
|---|---|---|---|---|---|---|---|---|---|---|
| Epoxy paint | Adhesion evaluated after: | Model paints | | | | | | | | |
| overcoated after: (hours) | (hours and conditions) | 105-5 | 105-4 | 105-3 | 105-2 | 105-15 | 105-14 | 105-13 | 105-6 | 105-7 |
| 24 | 24 | Pass* | Pass | Pass | Pass | Pass | n.a. | n.a. | Pass | Pass |
| 24 | 24 immersed | Pass | Pass | Pass | Pass | Pass | n.a. | n.a. | Pass | Pass |

*Tacky

| Adhesion of the fouling release top coat to the model paints when dried and cured at 10° C., 80% relative humidity. | | | | | | | | | | |
|---|---|---|---|---|---|---|---|---|---|---|
| Model paint | Adhesion evaluated after: | Model paints | | | | | | | | |
| overcoated after: (hours) | (hours and conditions) | 105-5 | 105-4 | 105-3 | 105-2 | 105-15 | 105-14 | 105-13 | 105-6 | 105-7 |
| 24 | 24 | Fail* | Pass | Pass | Pass | Pass | n.a. | n.a. | Pass | Pass |
| 24 | 24 immersed | Pass* | Pass | Pass | Pass | Pass | n.a. | n.a. | Pass | Fail |

Adhesion of the fouling release top coat to the model paints when dried and cured at 10° C., 80% relative humidity.

| Model paint overcoated after: (hours) | Adhesion evaluated after: (hours and conditions) | Model paints | | | | | | | | |
|---|---|---|---|---|---|---|---|---|---|---|
| | | 105-5 | 105-4 | 105-3 | 105-2 | 105-15 | 105-14 | 105-13 | 105-6 | 105-7 |
| 30 | 24 immersed | Pass | Pass | Pass | Pass | Pass | n.a. | n.a. | Pass | Fail |

*Tacky when overcoated.

Adhesion to anticorrosive epoxy paint when dried and cured at 20° C., 50% relative humidity. (Top coat not applied)

| Epoxy paint overcoated after: (hours) | Adhesion evaluated after: (hours and conditions) | Model paints | | | | | | | | |
|---|---|---|---|---|---|---|---|---|---|---|
| | | 105-5 | 105-4 | 105-3 | 105-2 | 105-15 | 105-14 | 105-13 | 105-6 | 105-7 |
| 24 | 24 | Pass | Pass | Pass | Pass | Pass | n.a. | n.a. | Pass | Pass |
| 24 | 24 immersed | Pass | Pass | Pass | Pass | Pass | n.a. | n.a. | Pass | Pass |

Adhesion of the fouling release top coat to the model paints when dried and cured at 20° C., 50% relative humidity.

| Model paint overcoated after: (hours) | Adhesion evaluated after: (hours and conditions) | Model paints | | | | | | | | | |
|---|---|---|---|---|---|---|---|---|---|---|---|
| | | 105-5 | 2-51-1 | 105-4 | 105-3 | 105-2 | 105-15 | 105-14 | 105-13 | 105-6 | 105-7 |
| 24 | 24 immersed | Pass | Pass | Pass | Pass | Pass | Pass | n.a. | n.a. | Pass | Fail |
| 30 | 24 immersed | Pass | Pass | Pass | Pass | Pass | Pass | n.a. | n.a. | Pass | Fail |

EXAMPLES 2 - TABLE I

| Model paints (polysiloxane compounds) | Coating compositions (topcoat Hempasil 77100) | % by wet weight of pigments and fillers | % by wet weight of the binder phase of epoxy-functional polysiloxane | % by wet weight of the binder phase of epoxy-functional compounds | % by wet weight of the binder phase of amino-functional polysiloxane |
|---|---|---|---|---|---|
| 1 (a) | 80 g Amerlock 400 curing system plus 20 g SF1708 (reference, GB 2300370, eksempel 14) | n.a | n.a | n.a | n.a |
| 2 (a) | 80 g Hempadur 15570 plus 6.1 g Silres 44100 | 36.4 | — | 32.9 | 11.1 |
| 3 (a + c) | 80 g Hempadur 15570 plus 6.1 g Silres 44100 and 1.5 g Rhodorsil 48V100 | 35.8 | — | 32.1 | 10.8 |

EXAMPLES 2 - TABLE I-continued

| # | Model paints (polysiloxane compounds) | | | | |
|---|---|---|---|---|---|
| 4 (a) | 80 g Hempadur 15570 plus 20 g SF1708 | 31.3 | — | 26.3 | 29.1 |
| 5 (a) | 80 g Hempadur 15570 plus 1.5 g Silres 44100 | 38.4 | — | 36.0 | 3.0 |
| 6 (a + c) | 80 g Hempadur 15570 plus 1.5 g Silres 44100 and 1.5 g Rhodorsil 48V100 | 37.7 | — | 34.9 | 2.9 |
| 7 (a + c) | Same as above with KE-45TS topcoat instead of Hempasil 77100 | | | | |
| 8 (a + b + c) | 80 g Hempadur 15570 plus 1.5 g Silres 44100, 1.5 g Silikoftal ED and 1.5 g Rhodorsil 48V100 | 37.1 | 2.8 | 36.7 | 2.8 |
| 9 (a + b + c) | 80 g Hempadur 15570 plus 3.3 g ES-1002T, 1.5 g Silres 44100 and 1.5 g Rhodorsil 48V100 | 36.3 | 6.0 | 38.8 | 2.7 |
| 10 (a + b + c) | 80 g Hempadur 15570 plus 1.5 g Silikoftal ED, 4.9 g SF1708 and 1.5 g Rhodorsil 48V100 | 35.6 | 2.7 | 34.6 | 8.7 |
| 11 | 80 g Hempadur 15570 (reference) | 39.2 | — | 37.1 | — |
| 12 | 80 g Hempadur 15570 plus 0.8 g Dynasilan Glymo and 0.5 g Wacker Addid 900 | 38.5 | — | 37.7 | — |
| 13 (c) | 80 g Hempadur 15570 plus 0.8 g Dynasilan Glymo, 0.5 g Wacker Addid 900 and 1.5 Rhodorsil 48V100 | 37.8 | — | 36.6 | — |
| 14 | 80 g Hempadur 15570 plus 0.8 g Dynasilan Glymo | 38.8 | — | 38.1 | — |
| 15 (c) | 80 g Hempadur 15570 plus 0.8 g Dynasilan Glymo and 1.5 g Rhodorsil | 38.1 | — | 37.0 | — |
| 16 | 80 g Hempadur 15570 plus 0.5 g Wacker Addid 900 | 38.9 | — | 36.7 | — |
| 17 (c) | 80 g Hempadur 15570 plus 0.5 g Wacker Addid 900 and 1.5 g Rhodorsil 48V100 | 38.2 | — | 35.6 | — |
| 18 | 85 g Amerlock 400 curing system plus 15 g AMMO solution (reference, EP1013727, ex. 1) | n.a | n.a | n.a. | n.a. |
| 19 (a + b + c) | 80 g Hempadur 15570 plus 15 g Silres 44100, 15 g Silikoftal ED and 1.5 g Rhodorsil 48V100 | 28.1 | 18.7 | 41.2 | 18.7 |

| Model paints (polysiloxane compounds) | % by wet weight of the binder phase of amino-functional compounds | % by wet weight of the binder phase of adhesion promoting agent | Hydrogen equivalents:Epoxy equivalents | Recoat interval | Adhesion 24 h |
|---|---|---|---|---|---|
| 1 (a) | n.a | n.a | n.a | 4 h | Fail |
|  |  |  |  | 24 h | Fail |
| 2 (a) | 16.4 | — | 195:100 | 4 h | Fail |
|  |  |  |  | 24 h | Fail |
| 3 (a + c) | 16.0 | 2.7 | 195:100 | 4 h | Pass |
|  |  |  |  | 24 h | Pass |

EXAMPLES 2 - TABLE I-continued

|  |  |  |  |  |  |
|---|---|---|---|---|---|
| 4 (a) | 33.3 | — | 195:100 | 4 h | Fail |
|  |  |  |  | 24 h | Fail |
| 5 (a) | 8.8 | — | 129:100 | 24 h | Fail |
| 6 (a + c) | 8.5 | 2.9 | 129:100 | 24 h | Pass |
| 7 (a + c) |  |  |  | 24 h | Pass |
| 8 (a + b + c) | 8.3 | 2.8 | 116:100 | 24 h | Pass |
| 9 (a + b + c) | 8.0 | 2.7 | 116:100 | 24 h | Pass |
| 10 (a + b + c) | 13.8 | 2.7 | 116:100 | 24 h | Pass |
| 11 | 6.0 | — | 107:100 | 24 h | Fail |
| 12 | 6.8 | — | 117:100 | 24 h | Fail |
| 13 (c) | 6.6 | 2.9 | 117:100 | 24 h | Fail |
| 14 | 5.9 | — | 96:100 | 24 h | Fail |
| 15 (c) | 5.7 | 2.9 | 96:100 | 24 h | Fail |
| 16 | 6.9 | — | 131:100 | 24 h | Fail |
| 17 (c) | 6.7 | 3.0 | 131:100 | 24 h | Fail |
| 18 | n.a | n.a | n.a | 24 h | Fail |
| 19 (a + b + c) | 22.3 | 1.9 | 149:100 | 24 h | Pass |

Comments:

Results shows that the presence of a + c or a + b + c gives excellent adhesion. However, the presence of a itself does not insure proper adhesion. Neither does any of the various silane systems, regardless of the presence of the adhesion promoter c

EXAMPLES 3 - TABLE I

|  | Model paints (polysiloxane compounds) | | | | |
|---|---|---|---|---|---|
|  | 20 (b) (Reference, JP03258876, example 2) | 21 (b) | 22 (b + c) | 23 (b) (Reference, JP03258876, example 3) | 24 (a + b + c) |
| Component 1: Epoxy-functional polysiloxane |  |  |  |  |  |
| Silikoftal ED |  | 14.4 | 14.4 |  |  |
| ES-1002T | 32 |  |  | 24 | 90.9 |
| Epicoat 1001 |  |  |  | 8 |  |
| Additives |  |  |  |  |  |
| Levelling agents, de-foaming agents, plasticizers, etc. |  |  |  |  | 4.8 |
| Pigments and fillers |  |  |  |  |  |
| Titanium dioxide | 12 | 12 | 12 | 12 |  |
| Precipitated barium sulphate | 12 | 12 | 12 | 12 |  |
| Graphite | 8 | 8 | 8 | 8 |  |
| Talc | 8 | 8 | 8 | 8 |  |
| Bentonite | 0.8 | 0.8 | 0.8 | 0.8 |  |
| Black iron oxide |  |  |  |  | 10.2 |
| Extender pigment |  |  |  |  | 50 |
| Solvents |  |  |  |  |  |
| Xylene | 5.6 | 5.6 | 5.6 | 5.6 | 30.1 |
| Toluene | 2.2 | 2.2 | 2.2 | 6 |  |
| n-Butanol |  |  |  | 2 |  |
| Methyl isobutyl ketone |  |  |  | 2 |  |
| 2-Ethoxy ethyl acetate | 1.6 | 1.6 | 1.6 | 1.6 |  |
| Total Component 1 | 82.2 | 64.6 | 64.6 | 90 | 186 |
| Component 2: Amino-functional silicon compound |  |  |  |  |  |
| Silres 44100 VP 90% solid |  |  |  |  | 29.2 |
| KBM 603 |  | 1 | 1 | 1 |  |

EXAMPLES 3 - TABLE I-continued

| | | | | | |
|---|---|---|---|---|---|
| Amino-functional compound of non silicone origin | | | | | |
| Sunmide X-2800 | | | | 10 | |
| Component 3: Adhesion promoting agent | | | | | |
| Rhodorsil 48 V 100 | | | 1.5 | | 2.5 |
| Total | 83.2 | 65.6 | 67.1 | 100 | 217.7 |

| | Model paints (polysiloxane compounds) | | | | |
|---|---|---|---|---|---|
| | 20 (b) | 21 (b) | 22 (b + c) | 23 (b) | 24 (a + b + c) |
| % by wet weight of pigments and fillers. | 49.0 | 62.2 | 60.8 | 40.8 | 27.7 |
| % by wet weight of the binder phase of epoxy-functional polysiloxane. | 75.5 | 58.1 | 54.8 | 40.5 | 57.7 |
| % by wet weight of the binder phase of epoxy-functional compounds | 75.5 | 58.1 | 54.8 | 54.1 | 57.7 |
| % by wet weight of the binder phase of amino-functional polysiloxane | — | — | — | — | 18.5 |
| % by wet weight of the binder phase of amino-functional compounds | 2.4 | 4.0 | 3.8 | 16.9 | 18.5 |
| % by wet weight of the binder phase of adhesion promoting agent | — | — | 5.7 | — | 1.6 |
| Hydrogen Equivalents:Epoxy Equivalents | 35:100 | 41:100 | 41:100 | 329:100 | 132:100 |

EXAMPLES 3 - TABLE II

Adhesion of the fouling release top coat to the model paints when dried and cured at 20° C., 50% relative humidity.

| Model paint overcoated after 24 h with topcoat | Adhesion evaluated after 24 h (conditions) | Model paints (polysiloxane compounds) | | | | |
|---|---|---|---|---|---|---|
| | | 20 (b) | 21 (b) | 22 (b + c) | 23 (b) | 24 (a + b + c) |
| KE-45TS | | Pass | Pass | Fail | Fail | n.a. |
| KE-45TS | immersed | Pass | Pass | Pass | Fail | n.a. |
| Hempasil 77100 | | Fail | Fail | Pass | Fail | Pass |
| Hempasil 77100 | immersed | Fail | Fail | Pass | Fail | Pass |
| Hempasil 77100 | Droplet tests (acetyl acetone) | Fail | Fail | Fail | Fail | Pass |
| Hempasil 77100 | immersed, Droplet test (xylene) | Fail | Fail | Fail | Fail | Pass |
| Hempasil 77100 | immersed, Droplet test (acetyl acetone) | Fail | Fail | Fail | Fail | Pass |

Comments:
Systems with b as sole polysiloxane compound only results in good adhesion when the topcoat is the oxime-based KE-45TS. The combination of b + c gives good adhesion (also for the oxime-based topcoat when immersed), whereas the combination of a + b + c gives good adhesion which also can withstand the harsh droplet test.

EXAMPLES 4 - TABLE I

| | Model paints (polysiloxane compounds) | | | | | | | | | | | | |
|---|---|---|---|---|---|---|---|---|---|---|---|---|---|
| | 25 (a + b + c) | 26 (a + b + c) | 27 (a + b + c) | 28 (a + b + c) | 29 (a + b + c) | 30 (a + b + c) | 31 (a + b + c) | 32 (a + b + c) | 33 (a + b + c) | 34 (a + b + c) | 35 (a + b + c) | 36 (a + b + c) | 37 (a + b + c) |
| Component 1 Epoxy-functional polysiloxane | | | | | | | | | | | | | |
| Silikoftal ED | 35.6 | 22.7 | 36.4 | 23.4 | 27.2 | 27.2 | 27.2 | 26.8 | 26.7 | 31.4 | 20.0 | 32.1 | 20.6 |

EXAMPLES 4 - TABLE I-continued

| | Model paints (polysiloxane compounds) | | | | | | | | | | | | |
|---|---|---|---|---|---|---|---|---|---|---|---|---|---|
| | 25 (a + b + c) | 26 (a + b + c) | 27 (a + b + c) | 28 (a + b + c) | 29 (a + b + c) | 30 (a + b + c) | 31 (a + b + c) | 32 (a + b + c) | 33 (a + b + c) | 34 (a + b + c) | 35 (a + b + c) | 36 (a + b + c) | 37 (a + b + c) |
| Additives | | | | | | | | | | | | | |
| Levelling agents, defoaming agents, plasticizers etc. | 3.4 | 2.5 | 3.4 | 2.5 | 2.8 | 2.8 | 2.8 | 2.8 | 2.8 | 3.2 | 2.4 | 3.2 | 2.4 |
| Pigments and fillers | | | | | | | | | | | | | |
| Black iron oxide | 4.0 | 7.9 | 3.9 | 7.8 | 6.1 | 6.1 | 6.1 | 6.0 | 5.9 | 4.0 | 7.8 | 3.9 | 7.8 |
| Extender pigment | 19.6 | 38.8 | 19.5 | 38.7 | 29.9 | 29.9 | 29.9 | 29.5 | 29.4 | 19.5 | 38.7 | 19.5 | 38.6 |
| Solvents | | | | | | | | | | | | | |
| Xylene | 19.4 | 16.5 | 19.4 | 16.5 | 17.8 | 17.8 | 17.8 | 18.9 | 19.2 | 19.4 | 16.5 | 19.3 | 16.4 |
| Total component 1: | 82.0 | 88.4 | 82.6 | 88.9 | 83.8 | 83.8 | 83.8 | 84.0 | 84.0 | 77.5 | 85.4 | 78.0 | 85.8 |
| Component 2: Amino-functional silicon compound | | | | | | | | | | | | | |
| Silres 44100 | 16.9 | 10.8 | 17.3 | 11.1 | 15.8 | 15.8 | 15.8 | 15.6 | 15.5 | 21.6 | 13.8 | 22.0 | 14.2 |
| Component 3: Adhesion promoting agent | | | | | | | | | | | | | |
| DC 2-1273 | 1.1 | 0.9 | 0.06 | 0.05 | 0.5 | 0.5 | | 0.5 | 0.5 | 1.1 | 0.9 | 0.06 | 0.05 |
| Rhodorsil 48V100 | | | | | | | 0.5 | | | | | | |
| Total: | 100.0 | 100.1 | 99.96 | 100.05 | 100.1 | 100.1 | 100.1 | 100.1 | 100.0 | 100.2 | 100.1 | 100.06 | 100.05 |
| by wet wgt of pigments and fillers. | 23.6 | 46.7 | 23.4 | 46.5 | 36.0 | 36.0 | 36.0 | 35.5 | 35.3 | 23.5 | 46.5 | 23.4 | 46.4 |
| % by wet weight of the binder phase of epoxy-functional polysiloxane. | 46.6 | 42.5 | 47.5 | 43.7 | 42.4 | 42.4 | 42.4 | 41.5 | 41.3 | 40.9 | 37.3 | 41.9 | 38.4 |
| % by wet wgt of the binder phase of epoxy-fct compounds | 46.6 | 42.5 | 47.5 | 43.7 | 42.4 | 42.4 | 42.4 | 41.5 | 41.3 | 40.9 | 37.3 | 41.9 | 38.4 |
| % by wet weight of the binder phase of amino functional polysiloxane | 22.1 | 20.2 | 22.6 | 20.7 | 24.6 | 24.6 | 24.6 | 24.1 | 24.0 | 28.2 | 25.7 | 28.7 | 26.5 |
| % by wet weight of the binder phase of amino-functional compounds | 22.1 | 20.2 | 22.6 | 20.7 | 24.6 | 24.6 | 24.6 | 24.1 | 24.0 | 28.2 | 25.7 | 28.7 | 26.5 |
| % by wet weight of the binder phase of adhesion prom. agent | 1.4 | 1.7 | 0.1 | 0.1 | 0.8 | 0.8 | 0.8 | 0.8 | 0.8 | 1.4 | 1.7 | 0.1 | 0.1 |
| Hydrogen eq:Epoxy Eq | 88:100 | 88:100 | 88:100 | 88:100 | 108:100 | 108:100 | 108:100 | 108:100 | 108:100 | 127:100 | 128:100 | 127:100 | 128:100 |

EXAMPLES 4 - TABLE II

| Adhesion evaluated after 24 h (exposure) | Model paints (polysiloxane compounds) | | | | | | | | | | | | |
|---|---|---|---|---|---|---|---|---|---|---|---|---|---|
| | 25 (a + b + c) | 26 (a + b + c) | 27 (a + b + c) | 28 (a + b + c) | 29 (a + b + c) | 30 (a + b + c) | 31 (a + b + c) | 32 (a + b + c) | 33 (a + b + c) | 34 (a + b + c) | 35 (a + b + c) | 36 (a + b + c) | 37 (a + b + c) |
| Immersed | Pass | Pass | Pass | Pass | Pass | Pass | Pass | Pass | Pass | Pass | Pass | Pass | Pass |
| Droplet test (acetyl acetone) | Pass | Pass | Pass | Pass | Pass | Pass | Pass | Pass | Pass | Pass | Pass | Pass | Pass |
| | Pass | Pass | Fail | Fail | Pass | Pass | Pass | Pass | Pass | Pass | Pass | Fail | Fail |
| immersed, Droplet test (acetyl acetone) | Pass | Pass | Fail | Fail | Pass | Pass | Pass | Pass | Pass | Pass | Pass | Fail | Fail |

Comments:
Various combinations of a + b + c gives good adhesion. All combinations, except when the amount of adhesion promoter (c) is 0.1% or lower (of wet weight of the binder phase), passed the Droplet test

EXAMPLE 5 - TABLE I

| | Model paints (polysiloxane compounds) | | | |
|---|---|---|---|---|
| | 38 (a + b + c) | 39 (a + b + c) | 40 (a + b + c) | 41 (a + b + c) |
| Component 1: Epoxy-functional polysiloxane | | | | |
| Silikoftal ED | 46.3 | 40.9 | 40.9 | 40.9 |
| Additives | | | | |
| Levelling agents, de-foaming agents, plasticizers, etc. Pigments and fillers | 4.1 | 4.8 | 4.8 | 4.8 |
| Black iron oxide | 11.2 | 10.2 | 10.2 | 10.2 |
| Extender pigment | 12.3 | 50.0 | 50.0 | 50.0 |
| Mineral fibres | 4.0 | | | |
| Solvents | | | | |
| Xylene | 16.3 | 30.1 | 30.1 | 30.1 |
| Total Component 1 | 94.2 | 136.0 | 136.0 | 136.0 |
| Component 2: Amino-functional silicon compound | | | | |
| Silres 44100 VP 90% solid | 35.5 | 29.2 | 29.2 | 29.2 |
| Component 3: Adhesion promoting agent | | | | |
| Rhodorsil H 48 V 100 | 2.3 | 5.0 | 25.0 | 2.5 |
| Total | 132.0 | 170.2 | 190.2 | 167.7 |
| % by wet weight of pigments and fillers. | 20.8 | 35.4 | 31.7 | 35.9 |
| % by wet weight of the binder phase of epoxy-functional polysiloxane. | 44.3 | 37.2 | 31.5 | 38.0 |
| % by wet weight of the binder phase of epoxy-functional compounds | 44.3 | 37.2 | 31.5 | 38.0 |
| % by wet weight of the binder phase of amino-functional polysiloxane | 34.0 | 26.5 | 22.5 | 27.2 |
| % by wet weight of the binder phase of amino-functional compounds | 34.0 | 26.5 | 22.5 | 27.2 |
| % by wet weight of the binder phase of adhesion promoting agent | 2.2 | 4.5 | 19.2 | 2.3 |
| Hydrogen Equivalents:Epoxy Equivalents | 142:100 | 132:100 | 132:100 | 132:100 |

EXAMPLE 5 - TABLE II

Adhesion of the fouling release top coat to the model paints when dried and cured at 20° C., 50% relative humidity.

| | Model paints (polysiloxane compounds) | | | |
|---|---|---|---|---|
| | 38 (a + b + c) | 39 (a + b + c) | 40 (a + b + c) | 41 (a + b + c) |
| Adhesion 24 h | Pass | Pass | Pass | Pass |

Comments:
Combinations of a + b + c, where the adhesion promoter (c) is in the ratio of 2.2 to 19.3% of wet weight of the binder phase, results in good adhesion

EXAMPLES 6 - TABLE I

| Model paints (polysiloxane compounds) | Coating compositions | % by wet weight of pigments and fillers | % by wet weight of the binder phase of epoxy-functional polysiloxane | % by wet weight of the binder phase of epoxy-functional compounds | % by wet weight of the binder phase of amino-functional polysiloxane | % by wet weight of the binder phase of amino-functional compounds | % by wet weight of the binder phase of adhesion promoting agent | Hydrogen equivalents:Epoxy equivalents | Recoat interval | Adhesion 24 h |
|---|---|---|---|---|---|---|---|---|---|---|
| 42 | Hempadur 45880 (reference) | 42.0 | — | 38.4 | — | 13.6 | — | 70:100 | 4 h | Fail |
| | | | | | | | | | 24 h | Fail |
| 43 (a) | 80 g Hempadur 45880 plus 1.6 g Silres 44100 | 41.2 | — | 37.2 | 3.3 | 16.4 | — | 77:100 | 4 h | Fail |
| | | | | | | | | | 24 h | Fail |

EXAMPLES 6 - TABLE I-continued

| Model paints (polysiloxane compounds) | Coating compositions | % by wet weight of pigments and fillers | % by wet weight of the binder phase of epoxy-functional polysiloxane | % by wet weight of the binder phase of epoxy-functional compounds | % by wet weight of the binder phase of amino-functional polysiloxane | % by wet weight of the binder phase of amino-functional compounds | % by wet weight of the binder phase of adhesion promoting agent | Hydrogen equivalents:Epoxy equivalents | Recoat interval | Adhesion 24 h |
|---|---|---|---|---|---|---|---|---|---|---|
| 44 (a) | 80 g Hempadur 45880 plus 4.0 g Silres 44100 | 40.0 | — | 35.4 | 7.9 | 20.4 | — | 87:100 | 4 h 24 h | Fail Fail |
| 45 (a + c) | 80 g Hempadur 45880 plus 1.6 g Silres 44100 and 1.6 g Rhodorsil 48V100 | 40.4 | — | 36.0 | 3.2 | 15.9 | 3.2 | 77:100 | 4 h 24 h | Pass Pass |
| 46 (a + c) | 80 g Hempadur 45880 plus 1.6 g Silres 44100 and 4.0 g Rhodorsil 48V100 | 39.3 | — | 34.3 | 3.1 | 15.2 | 7.7 | 77:100 | 4 h 24 h | Pass Pass |
| 47 (a + c) | 80 g Hempadur 45880 plus 4.0 g Silres 44100 and 1.6 g Rhodorsil 48V100 | 39.3 | — | 34.3 | 7.7 | 19.8 | 3.1 | 87:100 | 4 h 24 h | Pass Pass |
| 48 (a + c) | 80 g Hempadur 45880 plus 4.0 g Silres 44100 and 4.0 g Rhodorsil 48V100 | 38.2 | — | 32.8 | 7.4 | 19.0 | 7.4 | 87:100 | 4 h 24 h | Pass Pass |
| 49 (c) | 80 g Hempadur 45880 plus 1.6 g Rhodorsil 48V100 | 41.2 | — | 37.2 | — | 13.1 | 3.3 | 70:100 | 4 h 24 h | Fail Fail |
| 50 (c) | 80 g Hempadur 45880 plus 4.0 g Rhodorsil 48V100 | 40.0 | — | 35.4 | — | 12.5 | 7.9 | 70:100 | 4 h 24 h | Fail Fail |
| 51 (c) | 80 g Hempadur 45880 plus 8.0 g Rhodorsil 48V100 | 38.2 | — | 32.8 | — | 11.6 | 14.7 | 70:100 | 4 h 24 h | Fail Fail |

Comments:
Systems with "a + c" in various concentrations results in good adhesion, wheras systems with only "a" or c results in poor adhesion even though the concentrations are varied.

EXAMPLES 7 - TABLE I

| Model paints (polysiloxane compounds) | Coating compositions | % by wet weight of pigments and fillers | % by wet weight of the binder phase of epoxy-functional polysiloxane | % by wet weight of the binder phase of epoxy-functional compounds | % by wet weight of the binder phase of amino-functional polysiloxane | % by wet weight of the binder phase of amino-functional compounds |
|---|---|---|---|---|---|---|
| 52 (a + c) | 80 g Hempadur 15570 plus 1.5 g Silres 44100 and 1.5 g adhesion promotor | 37.7 | — | 34.9 | 2.9 | 8.5 |
| 53 (a + c) | 80 g Hempadur 15570 plus 3.0 g Silres 44100 and 6.0 g adhesion promotor | 35.2 | — | 31.3 | 5.2 | 10.2 |
| 54 | Hempadur 15570 (reference) | 39.2 | — | 37.1 | — | 6.0 |

EXAMPLES 7 - TABLE I-continued

| Model paints (polysiloxane compounds) | % by wet weight of the binder phase of adhesion promoting agent | Hydrogen equivalents:Epoxy equivalents | Adhesion promotor (tradename) | Recoat interval | Adhesion 24 h |
|---|---|---|---|---|---|
| 52 (a + c) | 2.9 | 122:100 | DC2-1273 | 24 h | Pass |
|  |  |  | 48V100 | 24 h | Pass |
| 53 (a + c) | 10.4 | 136:100 | DC2-1273 | 24 h | Pass |
|  |  |  | 48V100 | 24 h | Pass |
| 54 | — | 107:100 | — | 24 h | Fail |

Comments:

Systems with a + c in various concentrations. Two different adhesion promoters are used and all a + c systems gives good adhesion.

EXAMPLES 8 - TABLE I

| Model paints (polysiloxane compounds) | Coating compositions (topcoat Hempasil 77100) recoat interval 24 h | % by wet weight of pigments and fillers | % by wet weight of the binder phase of epoxy-functional polysiloxane | % by wet weight of the binder phase of epoxy-functional compounds | % by wet weight of the binder phase of amino-functional polysiloxane |
|---|---|---|---|---|---|
| 55 (a + c) | 127.6 g Hempadur 15570 plus 2.5 g Silres 44100 and 2.5 g DC2-1273. | 37.9 | 0 | 28.0 | 2.7 |
| 56 (a + c) | 103.9 g Hempadur 15570 base (15579) plus 2.5 g DC2-1273 plus model curing agent made of 14.4 g Silres 44100, 4.0 g Araldite GZ 7071X75CH, 6.6 g additives (defoaming and plasticizer), 3.6 g xylene and 3.7 g butylalcohol. | 36.3 | 0 | 26.1 | 14.2 |
| 57 (a + c) | 103.9 g Hempadur 15570 base (15579) plus 2.5 g DC2-1273 plus model curing agent made of 12.3 g Silres 44100, 4.0 g Araldite GZ 7071X75CH, 5.6 g additives (defoaming and plasticizer), 3.1 g xylene and 3.1 g butylalcohol. | 37.2 | 0 | 27.4 | 12.7 |
| 58 (a + c) | 103.9 g Hempadur 15570 base (15579)) plus 2.5 g DC2-1273 plus model curing agent made of 16.6 g Silres 44100, 4.0 g Araldite GZ 7071X75CH, 7.6 g additives (defoaming and plasticizer), 4.1 g xylene and 4.3 g butylalcohol. | 33.2 | 0 | 24.9 | 15.6 |
| 59 (a + b + c) | 103.9 Hempadur 15570 base (15579) plus 2.5 g DC2-1273 plus model curing agent made of the reaction product of 18.8 g Silres 44100, 2.9 g silikoftal ED, 6.6 g additives (defoaming and plasticizer), 3.6 g xylene and 3.7 g butylalcohol. | 35.4 | 3.0 | 25.1 | 17.9 |
| 60 (a + b + c) | 103.9 Hempadur 15570 base (15579) plus 2.5 g DC2-1273 plus model curing agent made of the reaction product of 16.0 g Silres 44100 and 2.5 g silikoftal ED, 5.6 g additives (defoaming and plasticizer), 3.1 g xylene and 3.1 g butylalcohol. | 36.8 | 2.8 | 26.1 | 16.2 |

EXAMPLES 8 - TABLE I-continued

| | | | 34.1 | 3.4 | 24.1 | 19.5 |
|---|---|---|---|---|---|---|
| 61 (a + b + c) | 103.9 Hempadur 15570 base (15579) plus 2.5 g DC2-1273 plus model curing agent made of the reaction product of 21.6 g Silres 44100 and 3.3 g silikoftal ED, 7.6 g additives (defoaming and plasticizer), 4.1 g xylene and 4.3 g butylalcohol. | | | | | |

| Model paints (polysiloxane compounds) | % by wet weight of the binder phase of amino-functional compounds | % by wet weight of the binder phase of adhesion promoting agent | Hydrogen equivalents:Epoxy equivalents | Adhesion 24 h | Droplet test (acetyl acetone) |
|---|---|---|---|---|---|
| 55 (a + c) | 8.7 | 3.1 | 133:100 | Pass | Fail |
| 56 (a + c) | 14.2 | 2.9 | 125:100 | Pass | Fail |
| 57 (a + c) | 12.7 | 3.0 | 103:100 | Pass | Fail |
| 58 (a + c) | 15.6 | 2.7 | 140:100 | Pass | Fail |
| 59 (a + b + c) | 17.9 | 2.8 | 168:100 | Pass | Pass |
| 60 (a + b + c) | 16.2 | 2.9 | 143:100 | Pass | Fail |
| 61 (a + b + c) | 19.5 | 2.6 | 193:100 | Pass | Pass |

The invention claimed is:

1. A method of coating a substrate, for establishing a fouling-release coating system the method comprising:
   (A) applying a first coating composition to at least a part of the surface of said substrate thereby establishing a tie-coat on said substrate, wherein said first coating composition comprises (i) 0-60% by wet weight of pigments and fillers; and (ii) the balance of a binder phase comprising:
   1-90% by wet weight of one or more amino-functional compounds, 1-90% by wet weight of one or more epoxy-functional compounds, and
   one or more adhesion promoting agents selected from the group consisting of hydroxy-functional polysiloxanes, hydroxyalkyl-functional polysiloxanes and $C_{1-4}$-alkoxy-functional polysiloxanes; and at least one member selected from the group consisting of
   (a) amino-functional polysiloxanes; and
   (b) epoxy-functional polysiloxanes; and
   wherein said one or more adhesion promoting agents are present in an amount of up to 20% by wet weight,
   and
   (B) applying a second coating composition onto said tie-coat thereby establishing a fouling release coating on said substrate.

2. The method according to claim 1, wherein the ratio between the hydrogen equivalents of the amino-functional compound(s) and the epoxy equivalents of the epoxy-functional compound(s) is in the range of 20:100 to 200:100.

3. The method according to claim 1, wherein the epoxy-functional compound(s) consisting essentially of one or more epoxy-functional silicon compounds, and the amino-functional compound(s) consisting essentially of one or more amino-functional silicon compounds.

4. The method according to claim 3, wherein the binder phase comprises 26-90% wet weight of polysiloxane-based constituents.

5. The method according to claim 1, wherein the epoxy-functional compound(s) comprise(s) one or more epoxy-functional compounds of non-silicon origin, and the amino-functional compound(s) comprise(s) one or more amino-functional compounds of non-silicon origin.

6. The method according to claim 5, wherein the binder phase comprises 2-50% by wet weight of polysiloxane- and silane-type constituents.

7. The method according to claim 1, wherein the binder phase comprises 0.1-15% by wet weight of the adhesion promoting agent(s).

8. The method according to claim 1, wherein the second coating composition is a second polysiloxane-based fouling release coating composition.

9. The method according to claim 1, wherein the binder phase comprises amino-functional polysiloxane(s) and epoxy-functional polysiloxane(s).

10. The method according to claim 1, wherein the binder phase of the coating composition comprises amino-functional polysiloxane(s), epoxy-functional polysiloxane(s), and the combination of one or more amino-functional compounds of non-silicon origin and one or more epoxy-functional compounds of non-silicon origin.

11. The method according to claim 1, wherein the binder phase of the coating composition comprises amino-functional polysiloxane(s), epoxy-functional silane(s), and adhesion promoting agent(s).

12. The method according to claim 11, wherein the binder phase of the coating composition further comprises the combination of one or more amino-functional compounds of non-silicon origin and one or more epoxy-functional compounds of non-silicon origin.

13. The method according to claim 1, wherein the binder phase of the coating composition comprises amino-functional silane(s), epoxy-functional polysiloxane(s), and adhesion promoting agent(s).

14. The method according to claim 13, wherein the binder phase of the coating composition further comprises the combination of one or more amino-functional compounds of non-silicon origin and one or more epoxy-functional compounds of non-silicon origin.

15. The method according to claim 1, wherein the binder phase of the coating composition comprises amino-functional polysiloxane(s), adhesion promoting agent(s), and the combination of one or more amino-functional compounds of non-silicon origin and one or more epoxy-functional compounds of non-silicon origin.

16. The method according to claim 1, wherein the binder phase of the coating composition comprises epoxy-functional polysiloxane(s), adhesion promoting agent(s), and the combination of one or more amino-functional compounds of non-silicon origin and one or more epoxy-functional compounds of non-silicon origin.

17. The method according to claim 1, wherein the binder phase of the coating composition comprises amino-functional polysiloxane(s), adhesion promoting agent(s), and epoxy-functional compound(s) of non-silicon origin.

18. The method according to claim 17, wherein the binder phase of the coating composition comprises amino-functional polysiloxane(s), epoxy-functional polysiloxane(s), adhesion promoting agent(s), and epoxy-functional compound(s) of non-silicon origin.

19. An article comprising a substrate, an epoxy-based coating on at least a part of the surface of said substrate, a tie-coat on said epoxy-based coating, and a fouling release coating on said tie-coat, wherein said tie-coat and said fouling release coating are applied on said epoxy-based coating according to the method defined in claim 1.

* * * * *